United States Patent
Boccon-Gibod et al.

(10) Patent No.: US 10,078,873 B2
(45) Date of Patent: Sep. 18, 2018

(54) TETHERED DEVICE SYSTEMS AND METHODS

(71) Applicant: Intertrust Technologies Corporation, Sunnyvale, CA (US)

(72) Inventors: Gilles Boccon-Gibod, Palo Alto, CA (US); Julien Boeuf, Palo Alto, CA (US); Gary F. Ellison, San Mateo, CA (US); David P. Maher, Livermore, CA (US)

(73) Assignee: Intertrust Technologies Corporation, Sunnyvale, CA (US)

( * ) Notice: Subject to any disclaimer, the term of this patent is extended or adjusted under 35 U.S.C. 154(b) by 42 days.

(21) Appl. No.: 15/224,861

(22) Filed: Aug. 1, 2016

(65) Prior Publication Data
US 2016/0343097 A1   Nov. 24, 2016

Related U.S. Application Data

(60) Continuation of application No. 14/480,502, filed on Sep. 8, 2014, now Pat. No. 9,426,133, which is a
(Continued)

(51) Int. Cl.
*G06F 15/16* (2006.01)
*G06F 15/173* (2006.01)
(Continued)

(52) U.S. Cl.
CPC .......... *G06Q 50/184* (2013.01); *G06F 21/10* (2013.01); *G06Q 20/3829* (2013.01);
(Continued)

(58) Field of Classification Search
CPC .... G06Q 20/3829; G06F 21/10; H04L 63/061
(Continued)

(56) References Cited

U.S. PATENT DOCUMENTS

| 5,850,451 A | 12/1998 | Sudia |
| 7,065,507 B2 * | 6/2006 | Mohammed ............ G06F 21/10 |
| | | 705/59 |

(Continued)

FOREIGN PATENT DOCUMENTS

| WO | WO 2004/038568 A | 5/2004 |
| WO | WO 2007/047846 A | 4/2007 |

OTHER PUBLICATIONS

"An Overview of the Advanced Access Content System"—Henry et al, University of Waterloo, May 2007 http://cacr.uwaterloo.ca/techreports/2007/cacr2007-25.pdf.*
(Continued)

*Primary Examiner* — Randy Scott
(74) *Attorney, Agent, or Firm* — Finnegan, Henderson, Farabow, Garrett & Dunner, LLP

(57) ABSTRACT

Systems and methods are described for applying digital rights management techniques to tethered devices. In one embodiment, a host device is operable to translate a relatively sophisticated license into a simpler format for use on a relatively low-capability device. In another embodiment, a method of using extended SCSI commands to communicate over a USB connection is provided.

20 Claims, 19 Drawing Sheets

Related U.S. Application Data division of application No. 12/178,588, filed on Jul. 23, 2008, now Pat. No. 8,850,195.

(60) Provisional application No. 60/951,349, filed on Jul. 23, 2007.

(51) Int. Cl.
*H04L 29/06* (2006.01)
*G06Q 50/18* (2012.01)
*G06F 21/10* (2013.01)
*G06Q 20/38* (2012.01)

(52) U.S. Cl.
CPC .... *H04L 63/061* (2013.01); *G06F 2221/0708* (2013.01); *G06F 2221/0717* (2013.01); *G06F 2221/0759* (2013.01)

(58) Field of Classification Search
USPC ...... 713/168, 169, 171, 172; 726/26, 27, 29; 380/281, 282, 284
See application file for complete search history.

(56) References Cited

U.S. PATENT DOCUMENTS

| | | | |
|---|---|---|---|
| 7,376,709 | B1 | 5/2008 | Brei et al. |
| 7,904,722 | B2* | 3/2011 | Sudia ............ G06Q 20/401 713/156 |
| 8,850,195 | B2 | 9/2014 | Boccon-Gibod et al. |
| 9,426,133 | B2 | 8/2016 | Boccon-Gibod et al. |
| 2002/0037732 | A1 | 3/2002 | Gous et al. |
| 2002/0076050 | A1 | 6/2002 | Chen et al. |
| 2002/0172367 | A1 | 11/2002 | Mulder et al. |
| 2002/0199105 | A1 | 12/2002 | Ishiguro et al. |
| 2005/0210249 | A1 | 9/2005 | Lee et al. |
| 2006/0048228 | A1 | 3/2006 | Takemori et al. |
| 2006/0153386 | A1* | 7/2006 | Ksontini ............ H04N 7/163 380/277 |
| 2006/0287956 | A1* | 12/2006 | Higashi ............ G06F 21/10 705/51 |
| 2007/0100701 | A1 | 5/2007 | Boccon-Gibod et al. |
| 2007/0100768 | A1 | 5/2007 | Boccon-Gibod et al. |
| 2007/0156599 | A1* | 7/2007 | Yoon ............ G06F 21/10 705/52 |
| 2007/0283418 | A1 | 12/2007 | Chen et al. |
| 2008/0098212 | A1 | 4/2008 | Helms et al. |
| 2010/0293369 | A1 | 11/2010 | Ramharter |

OTHER PUBLICATIONS

International Search Report and Written Opinion of the International Searching Authority for International Application No. PCT/US2008/009002, dated Mar. 3, 2009, 17 pages.

http://csrc.nist.gov/publications/histpubs/800-63/SP800-63V1_0_2.pdf, "Informational Security"—Burr et al., NIST, Jun. 2006.

"URL token authentication documentation"; CDN77, https://www.cdn77.com/documentation/CDNDocumentationTokenAuth.pdf; Aug. 2007.

Restriction Requirement dated Jul. 7, 2011, for U.S. Appl. No. 12/178,588, filed Jul. 23, 3008.

Office Action dated Sep. 28, 2011, for U.S. Appl. No. 12/178,588, filed Jul. 23, 2008.

Office Action dated Mar. 13, 2012, for U.S. Appl. No. 12/178,588, filed Jul. 23, 2008.

Final Office Action dated Sep. 25, 2012, for U.S. Appl. No. 12/178,588, filed Jul. 23, 2008.

Office Action dated Dec. 13, 2013, for U.S. Appl. No. 12/178,588, filed Jul. 23, 2008.

Notice of Allowance dated May 23, 2014, for U.S. Appl. No. 12/178,588, filed Jul. 23, 2008.

Office Action dated Sep. 17, 2015, for U.S. Appl. No. 14/480,502, filed Sep. 8, 2014.

Notice of Allowance dated Apr. 25, 2016, for U.S. Appl. No. 14/480,502, filed Sep. 8, 2014.

* cited by examiner

FIG. 5

TETHERED DEVICE SYSTEMS AND METHODS

RELATED APPLICATIONS

This application is a continuation of U.S. application Ser. No. 14/480,502, filed Sep. 8, 2014, which is a divisional of U.S. application Ser. No. 12/178,588, filed Jul. 23, 2008, now U.S. Pat. No. 8,850,195, which claims priority to U.S. Provisional Patent Application No. 60/951,349, filed Jul. 23, 2007, all of which are incorporated herein by reference in their entireties.

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND AND SUMMARY

In modern computing systems, it is often desirable to limit access to electronic content, services, or processing resources, or to allow only certain entities to perform certain actions. A variety of techniques have been developed or proposed to enable such control. These techniques are often referred to as digital rights management (DRM) techniques because, in general terms, their goal is to manage the rights of various entities in digital or other electronic content, services, or resources. Systems and methods are presented herein for facilitating the management of electronic content, and, in a preferred group of embodiments, for configuring, controlling, and/or using tethered devices. It will be appreciated that these systems and methods are novel, as are applications thereof and many of the components, systems, and methods employed therein. It should be appreciated that embodiments of the presently described inventive body of work can be implemented in numerous ways, including as processes, apparatuses, systems, devices, methods, computer readable media, and/or as a combination thereof. Several illustrative embodiments are described below.

BRIEF DESCRIPTION OF THE DRAWINGS

The inventive body of work will be readily understood by referring to the following detailed description in conjunction with the accompanying drawings, in which:

FIG. 5 shows an example device description document.

DETAILED DESCRIPTION

A detailed description of the inventive body of work is provided below. While several embodiments are described, it should be understood that the inventive body of work is not limited to any one embodiment, but instead encompasses numerous alternatives, modifications, and equivalents. In addition, while numerous specific details are set forth in the following description in order to provide a thorough understanding of the inventive body of work, some embodiments can be practiced without some or all of these details. Moreover, for the purpose of clarity, certain technical material that is known in the related art has not been described in detail in order to avoid unnecessarily obscuring the inventive body work.

In a preferred group of embodiments, systems and methods are provided for configuring, controlling, and/or using tethered devices. The systems and methods described herein can, for example, be used to extend a DRM system such as that described in commonly assigned, co-pending U.S. patent application Ser. No. 11/583,693, entitled Digital Rights Management Engine Systems and Methods, filed Oct. 18, 2006, and published as Publication No. 2007-0180519-A1 ("the '693 application"), the contents of which are hereby incorporated by reference, to enable a host entity that is more capable than a simpler device to export usage rules and content keys from one or more original licenses and produce very simple data structures that enable the device to consume content governed by the original licenses, but with a more limited expression of the usage rules encoded in the original licenses. From controls used to express usage rules (such as those described in the '693 application), the host creates simple validity statement (SVS) records that represent usage rules in the device. From links used to express relationships between entities in the host DRM system, the host creates link validity statement records that allow the device to build an internal representation of a graph of nodes analogous to the graph of nodes that exists in the host system.

Figure 1:
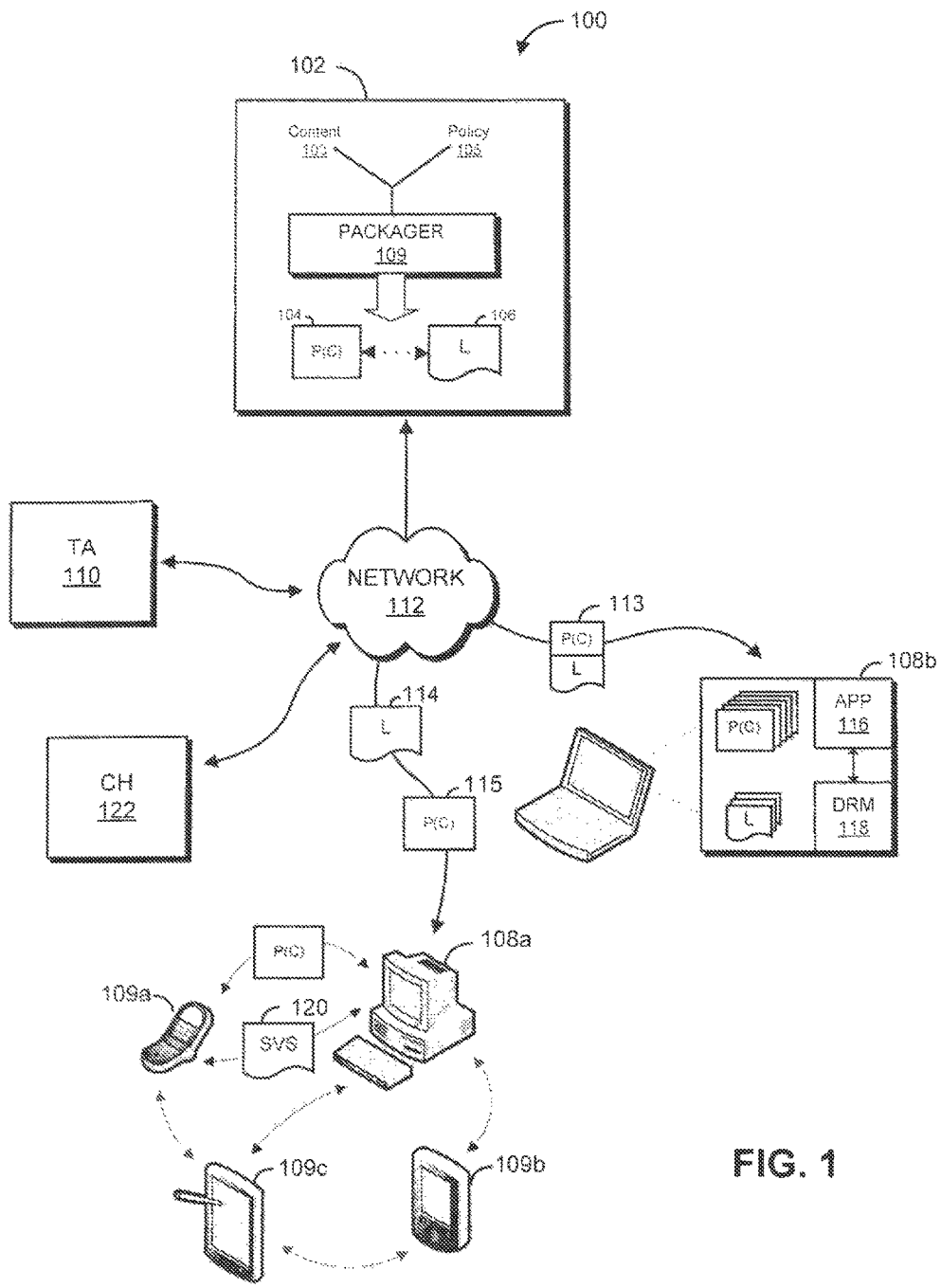
FIG. 1 shows a system for practicing embodiments of the inventive body of work.

FIG. 1 shows an example of a system 100 in which content is distributed and managed using a digital rights management system. In a preferred embodiment, a digital rights management system can be used such as that described in the '693 application; however, it will be appreciated that any suitable digital rights management system could be used in accordance with the principles set forth herein.

As shown in FIG. 1, an entity 102 holding rights in electronic content 103, packages the content for distribution and consumption by end users 108a, 108b (referred to collectively as "end users 108," where reference numeral 108 refers interchangeably to the end user or the end user's computing system, as will be clear from the context). For example, entity 102 may comprise a content owner, creator, or provider, such as a musician, movie studio, publishing house, software company, author, mobile service provider, Internet content download or subscription service, cable or satellite television provider, the employee of a corporation, or the like, or an entity acting on behalf thereof, and content 103 may comprise any electronic content. For example, content 103 may comprise digital video, audio, or textual content, a movie, a television show, a video clip, a song, a podcast, a video game, a piece of software, an email message, a text message, a word processing document, a report, or any other entertainment, enterprise, or other content. The packaging process will typically entail applying security protections to the content as dictated by the digital rights management system. For example, the content may be secured by one or more cryptographic mechanisms such as encryption or digital signature techniques, for which a trust authority 110 may be used to obtain the appropriate cryptographic keys, certificates, and/or the like.

In the example shown in FIG. 1, entity 102 uses a packaging engine 109 to associate a license or other form of electronic control 106 with the packaged content 104. License 106 is based on the policies 105 or other wishes of entity 102, and specifies permitted and/or prohibited uses of the content and/or one or more conditions that must be satisfied in order to make use of the content, or that must be satisfied as a condition or consequence of use. Of particular relevance here, the license may indicate whether the content can be used on a low-capability device, and, if so, what the terms of such use should be. While FIG. 1 shows the license being associated with the content by entity 102, it will be appreciated that in other embodiments such licenses could be associated and/or modified by another entity (e.g., a redistributor or other rightsholder).

As shown in FIG. 1, the packaged content 104 and associated license (or licenses) 106 are distributed to end users 108 via any suitable mechanism (e.g., via download or stream over a network 112 like the Internet, a local area network, a wireless network, a virtual private network, a wide area network, and/or the like; via recordable media such as a compact disc (CD), digital versatile disk (DVD), a flash memory card (e.g., a Secure Digital (SD) card), and/or the like; via cable, satellite, broadcast, or cellular communication; and/or the like), where the content is rendered for the user 108 in accordance with the terms of the associated license. As shown in FIG. 1, packaged content 104 can be delivered to the user together with license 106 in a single package or transmission 113, or in separate packages or transmissions 114, 115 received from the same or different sources.

Typically, the license terms will be enforced by a digital rights management engine running on the user's system 108. The end user's system may comprise a relatively high capability device (e.g., a personal computer 108a, a mobile telephone 108b, a television and/or television set-top box, a portable audio and/or video player, an electronic book reader, a gaming system, a person digital assistant, and/or other electronic device), or may comprise a relatively low capability device (e.g., some mobile telephones 109a, portable audio and/or video players 109b, personal digital assistants 109c, and/or the like). Devices 108, 109 will typically contain application software 116, hardware, and/or special-purpose logic that is operable to retrieve and render the content. Higher-capability devices 108 will typically contain a relatively sophisticated digital rights management engine 118 for evaluating the license 106 associated with the packaged content 104 and enforcing the terms thereof (and/or enabling application 116 to enforce such terms), such as by selectively granting the user access to the content only if permitted by the license. Digital rights management engine 118 may be structurally or functionally integrated with application 116, or may comprise a separate piece of software and/or hardware. Alternatively, lower capability devices 109 may contain an application 116 and/or a relatively simple digital rights management engine that is only capable of enforcing less-complex conditions 120 derived from license 106 by the DRM engine 118 running on a more capable device 108.

The digital rights management engine, and/or other software on the user's system, or in remote communication therewith, may also record information regarding the user's access to or other use of the protected content. In some embodiments, some or all of this information might be communicated to a remote party (e.g., a clearinghouse 122, the content creator, owner, or provider 102, the user's manager, an entity acting on behalf thereof, and/or the like), e.g., for use in allocating revenue (such as royalties, advertisement-based revenue, etc.), determining user preferences, enforcing system policies (e.g., monitoring how and when confidential information is used), and/or the like. It will be appreciated that while FIG. 1 shows an illustrative DRM architecture and a set of illustrative relationships, the systems and methods described herein can be practiced in any suitable context, and thus it will be appreciated that FIG. 1 is provided for purposes of illustration and explanation, not for purposes of limitation.

Figure 2:
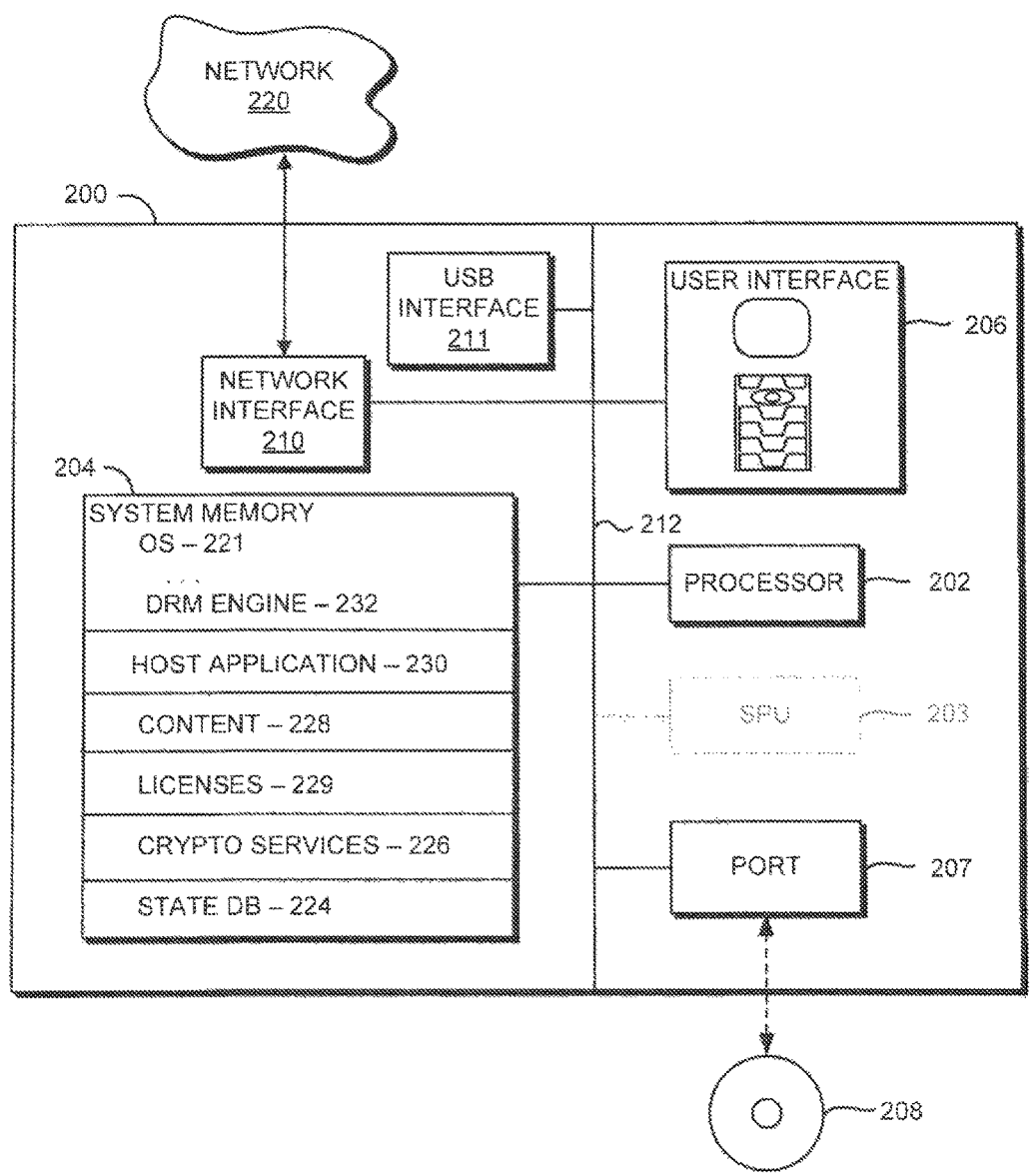
FIG. 2 shows an example of a host system.

FIG. 2 shows a more detailed example of one possible embodiment of a system 200 that could be used to practice embodiments of the inventive body of work. For example, system 200 might comprise an embodiment of an end user's device 108, a content provider's device 102, and/or the like. For example, system 200 may comprise a general-purpose computing device such as a personal computer 108a, 108b or a network server, or a specialized computing device such as a cellular telephone, personal digital assistant, portable audio or video player, television set-top box, kiosk, gaming system, or the like. System 200 will typically include a processor 202, memory 204, a user interface 206, a port 207 for accepting removable memory 208, a network interface 210, a Universal Serial Bus (USB) interface 211, and one or more buses 212 for connecting the aforementioned elements. The operation of system 200 will typically be controlled by processor 202 operating under the guidance of programs stored in memory 204 (and/or other computer-readable media, such as removable memory 208). Memory 204 will generally include both high-speed random-access memory (RAM) and non-volatile memory such as a magnetic disk and/or flash EEPROM. Some portions of memory 204 may be restricted, such that they cannot be read from or written to by other components of the system 200. Port 207 may comprise a disk drive or memory slot for accepting removable memory 208 such as diskettes, CD-ROMs, DVDs, memory cards, SD cards, other magnetic or optical media, and/or the like. USB interface 211 is operable to communicate with other computing and/or storage devices using the USB protocol. Network interface 210 is typically operable to provide a connection between system 200 and other computing devices (and/or networks of computing devices) via a network 220 such as the Internet or an intranet (e.g., a LAN, WAN, VPN, etc.), and may employ one or more communications technologies to physically make such a connection (e.g., wireless, Ethernet, and/or the like). In some embodiments, system 200 might also include a processing unit 203 that is protected from tampering by a user of system 200 or other entities. Such a secure processing unit can help enhance the security of sensitive operations such as key management, signature verification, and other aspects of the digital rights management process.

As shown in FIG. 2, memory 204 of computing device 200 may include a variety of programs or modules for controlling the operation of computing device 200. For example, memory 204 will typically include an operating system 221 for managing the execution of applications, peripherals, and the like; a host application 230 for rendering protected electronic content; and a DRM engine 232 for implementing some or all of the rights management functionality described herein (and the host-related functionality in particular). As described elsewhere herein and in the '693 application, DRM engine 232 may comprise, interoperate with, and/or control a variety of other modules, such as a virtual machine for executing control programs, a state database 224 for storing state information, and/or one or more cryptographic modules 226 for performing cryptographic operations such as encrypting and/or decrypting content, computing hash functions and message authentication codes, evaluating digital signatures, and/or the like. Memory 204 will also typically include protected content 228 and associated licenses 229, as well as cryptographic keys, certificates, and the like (not shown).

Figure 3:
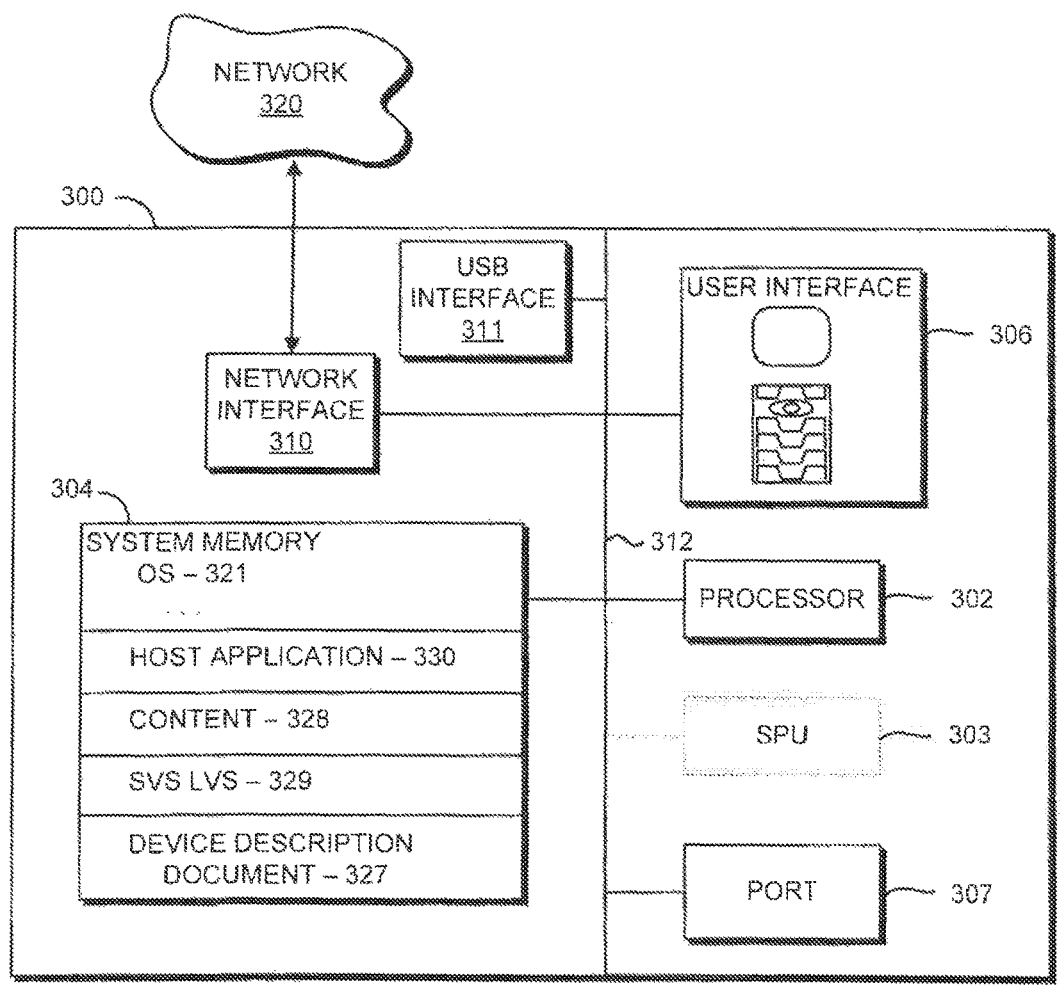
FIG. 3 shows an example of a tethered device.

FIG. 3 shows a more detailed example of one possible embodiment of a computing device 300 that is less capable than computing device 200 and/or that has less sophisticated digital rights management capabilities. For example, system 300 may comprise a cellular telephone 109a, personal digital assistant 109c, portable audio or video player 109b, television set-top box, kiosk, gaming system, or the like. System 300 will typically include a processor 302, memory 304, a user interface 306, a port 307 for accepting removable memory, a network interface 310, a USB interface 311, and one or more buses 312 for connecting the aforementioned elements. The operation of system 300 will typically be controlled by processor 302 operating under the guidance of programs stored in memory 304. Memory 304 will generally include both high-speed random-access memory (RAM) and non-volatile memory such as a magnetic disk and/or flash EEPROM. Some portions of memory 304 may be restricted, such that they cannot be read from or written to by other components of the system 300. USB interface 311 and/or network interface 310 are operable to provide a connection between system 300 and a system such as system 200 that has more sophisticated DRM capabilities. In some embodiments, system 300 might also include a processing unit 303 that is protected from tampering by a user of system 300 or other entities.

As shown in FIG. 3, memory 304 may include a variety of programs or modules for controlling the operation of computing device 300. For example, memory 304 will typically include an operating system 321 for managing the execution of applications and the like, and a host application 330 for rendering protected electronic content in accordance with relatively simple licenses 329. Alternatively, or in addition, in some embodiments, system 300 may include a separate DRM engine for implementing some or all of the rights management functionality described herein (and the tethered device-related functionality in particular). Memory 304 will also typically include protected content 328, a device description document 327 (described in more detail below), as well as cryptographic keys, certificates, and the like (not shown).

One of ordinary skill in the art will appreciate that the systems and methods described herein can be practiced with computing devices similar or identical to those illustrated in FIG. 2 and FIG. 3, or with virtually any other suitable computing device, including computing devices that do not possess some of the components shown in FIG. 2 and/or FIG. 3, and/or computing devices that possess other components that are not shown. Thus it should be appreciated that FIG. 2 and FIG. 3 are provided for purposes of illustration and not limitation.

The discussion herein focuses primarily on systems and methods for enabling relatively low-capability devices and/or high-capability devices with relatively low-capability DRM (collectively, "tethered devices") to securely process protected electronic content in accordance with associated licensing restrictions provided by a higher-capability host system, with the assumption that if the host system and tethered device operate as intended, the terms of the license will be enforced. In practical applications of the systems and methods described herein, protection of the host system and the tethered device (e.g., the applications and hardware employed by each) from malicious tampering or modification can be accomplished using any suitable combination of security techniques. For example, cryptographic mechanisms such as encryption, digital signatures, digital certificates, message authentication codes, and the like can be employed, e.g., as described in the '693 application, as could structural and/or tactical security measures such as software obfuscation, self-checking, customization, watermarking, anti-debugging, and/or other mechanisms. Representative examples of such techniques can be found, for example, in U.S. Pat. No. 6,668,325 B1, Obfuscation Techniques for Enhancing Software Security, and in commonly assigned U.S. patent application Ser. No. 11/102,306, published as US-2005-0183072-A1, and entitled Software Self-Defense Systems and Methods; U.S. patent application Ser. No. 11/737,428, published as US-2008-0028474-A1, and entitled Systems and Methods for Watermarking Software and Other Media; U.S. patent application Ser. No. 10/172,682, published as US-2003-0023856-A1, and entitled Software Self-Checking Systems and Methods; U.S. patent application Ser. No. 11/338,187, published as US-2006-0123249-A1, and entitled Trusted Storage Systems and Methods; and U.S. Pat. No. 7,124,170 B1, Secure Processing Unit Systems and Methods, each of which is hereby incorporated by reference in its entirety. Alternatively, or in addition, physical security techniques (e.g., the use of relatively inaccessible memory, secure processors, secure memory management units, hardware-protected operating system modes, and/or the like) can be used to further enhance security. Yet another form of security can be provided by the institutional design and operation of the system, and by the legal and social regulation of the participants therein. For example, entities in the system may be required to contractually agree to adhere to system specifications and requirements, may need to submit to a certification process during which the entity's compliance with system requirements could be verified, and/or the like. For example, a device or application may be required to implement the DRM engine in a way that is compatible with other implementations in the environment, and/or be required to provide a certain type or level of tamper resistance or other security. Digital certificates could be issued that attested to a device's or other entity's compliance with such requirements, and these certificates could be verified before allowing the device or entity to participate in the system, or as a condition of allowing continuing access. Such security techniques will be well-known to one of ordinary skill in the art, and it will be appreciated that any suitable combination of some, none, or all of these techniques could be used depending on the desired level of protection and/or the details of the particular application at hand. It will also be appreciated that while certain security mechanisms are described herein in connection with certain embodiments, use of these techniques is not required in all embodiments. Additional, non-limiting information on security techniques that can be used in connection with the inventive body of work is set forth in the '693 application.

A more detailed description of illustrative systems and methods for enabling tethered devices to securely process protected electronic content in accordance with associated licensing restrictions is provided below. In a preferred group of embodiments, a DRM system employing a DRM engine such as that described in the '693 application (sometimes referred to herein or in the '693 application as the "Octopus" DRM engine) is used. Although the following description of example embodiments will at times refer to such a DRM engine, it will be appreciated that the concepts illustrated in this description could be readily applied in the context of a different type of DRM system.

TERMINOLOGY

The following terminology is used herein in connection with the description of certain presently preferred embodiments:

"MSTD" refers to a "Marlin Simple Tethered Device", where "Marlin" is an example of a DRM system that employs an embodiment of the DRM engine described in the '693 application.

"MSTD Host" refers to a host system employing a DRM system such as that described in the '693 application with host extensions as described in more detail herein.

"MSTD Device" or "tethered device" refers to a device that implements the device-side portion of the functionality described herein. Although the term "tethered" device is used, it will be appreciated that a tethered device need not be permanently or physically connected to the host; instead, "tethered," as used herein, refers to the fact that the DRM performed by the tethered device is derived or related to the DRM performed by the host.

"Binding" refers to a mapping of certain protocol elements onto a specific technology, such as USB mass storage.

"Pairing" refers to the association of a host and a device, such as an MSTD host and an MSTD device.

Overview

Figure 4:
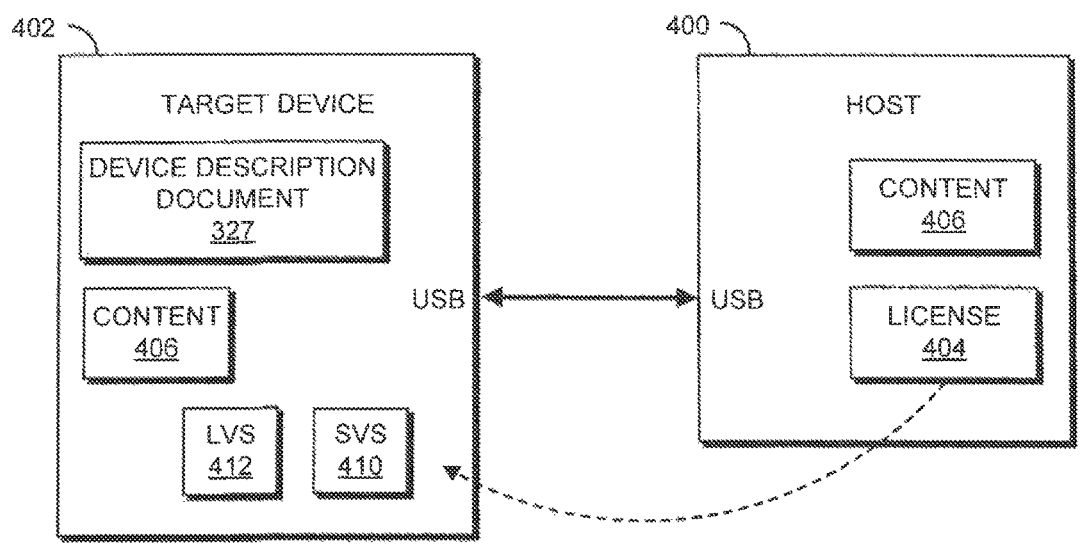
FIG. 4 shows an example of a system comprising a host and a tethered device.

FIG. 4 shows a host system 400 (e.g., a system such as system 108 in FIG. 1 or system 200 in FIG. 2) interacting with a tethered system 402 (e.g., a system such as system 109 in FIG. 1 or system 300 in FIG. 3). The systems and methods described herein can be used to enable host 400 to export usage rules and content keys from one or more original licenses 404 and produce very simple data structures 410, 412 that enable device 402 to consume content 406 governed by the original license(s) 404, but with a more limited expression of the usage rules encoded in the original licenses. From controls used to express usage rules (such as those described in the '693 application), host 400 creates simple validity statement (SVS) records 410 that represent usage rules in device 402. From links used to express relationships between entities in the host DRM system, the host 400 creates link validity statement (LVS) records 412 that allow the device 402 to build an internal representation of a graph of nodes analogous to the graph of nodes that exists in the host system.

Device Description

As shown in FIG. 3 and FIG. 4, in a preferred embodiment, each tethered device has a device description document 327. This document includes the static information about the device, including binding parameters. In one embodiment, a host locates the device description document for a device with which it wants to pair in a discovery phase. It will be appreciated that the details of how the discovery phase is implemented will typically depend on the specific bindings supported by the host and the device.

In one embodiment, the public information about a tethered device includes information about the version of the supported specifications and bindings, as well as the DRM node object that represents the device. For example, in an embodiment based on the DRM engine described in the '693 application, each tethered device has a corresponding DRM node that represents it. This node is of type "personality," and has an attribute name indicating that it is a supported tethered device.

FIG. 5 shows an example of a device description document in one illustrative embodiment. The device description document shown in FIG. 5 is an XML document, having the syntax shown in the schema attached as Appendix A. As shown in FIG. 5, in one embodiment the device description document has a relatively simple structure that includes:

<Personality>: the DRM node representing the tethered device.

<TransportBindings>: the transport bindings that are supported.

<SecurityBindings>: the security bindings that are supported.

Secure Authenticated Channel

For some communications between host 400 and device 402, it may be desirable to establish a secure authenticated channel (SAC). For example, a SAC can be used to update state variables, set trusted time on device 402, update a certificate revocation list on device 402, and/or the like. Once the channel is established, the host can send request messages to the device and receive response messages back. The SAC provides confidentiality, integrity, and protection against replay attacks. In one embodiment, the host logically initiates the request/response exchanges, even though in some bindings the device may be initiating the underlying communication channel. The device is a responder to the host. In a preferred embodiment, the secure authenticated channel can be implemented over a USB connection, as described in more detail below. In general terms, this can be accomplished by taking advantage of unused SCSI (small computer system interface) commands to enable communication between the device and the host.

Figure 6:
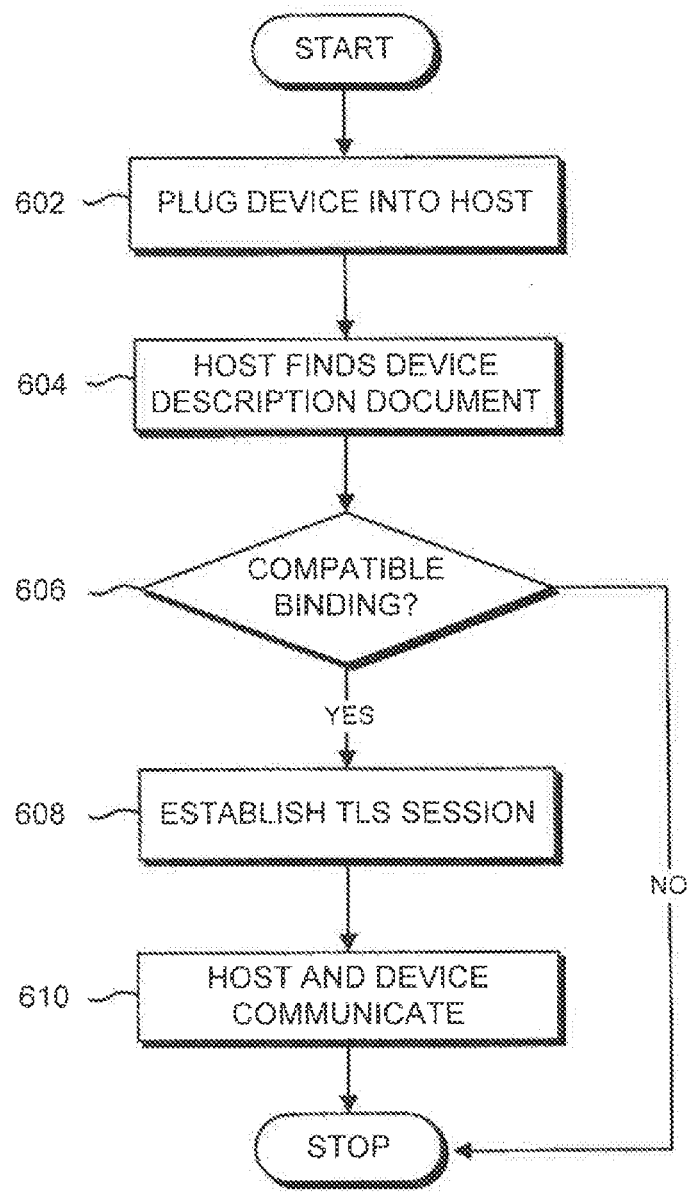
FIG. 6 is a flowchart that illustrates a process for establishing a secure authenticated channel between a host and a device.

FIG. 6 is a flowchart that illustrates a process for establishing a SAC between host 400 and device 402 (e.g., a transport layer security (TLS) SAC over USB). As shown in FIG. 6, the user plugs the device into the USB port of the host (602). The host then mounts the file system through the USB Mass Storage interface exposed by the device, and finds and parses the device description document (604). The host checks the device description and determines whether the device implements a compatible USB Mass Storage binding, so that it can send the right extended SCSI commands to the device (606). If the device implements a compatible USB Mass Storage binding, then the host establishes a Transport Layer Security session (608). The host can then communicate with the device over the SAC (610).

In one embodiment of blocks 606, 608, and 610 shown in FIG. 6, the host sends GET_DESCRIPTOR USB requests to the device, asking for a specific descriptor (e.g., String Descriptor 255, as described in more detail below). If the descriptor matches the specific MSTD USB Descriptor, the host knows which SCSI CBD Operation Code the device uses for MSTD commands. The host sets up a TLS session with the device by exchanging TLS records, and the host communicates with the device by exchanging MSTD request/respond records.

Pairing

In one embodiment, each pair of a unique host and a unique device constitutes a pairing. In one embodiment each pairing has a pairing ID that is a 128-bit value equal to the 128 least significant bits of the digest of the concatenation of the host's personality node ID, the octet 0, and the device's node ID (e.g., pairingId=H-128(hostId|0|deviceId)). Each pairing also has an associated pairing key. The pairing key for a pairing is selected by the host. The host can pick any key for the pairing, provided that it computes the same pairing key for each pairing regardless of when the host and the device communicate. For example, the host may compute the pairing key by computing the digest of the pairingId concatenated with a host secret.

Figure 7:
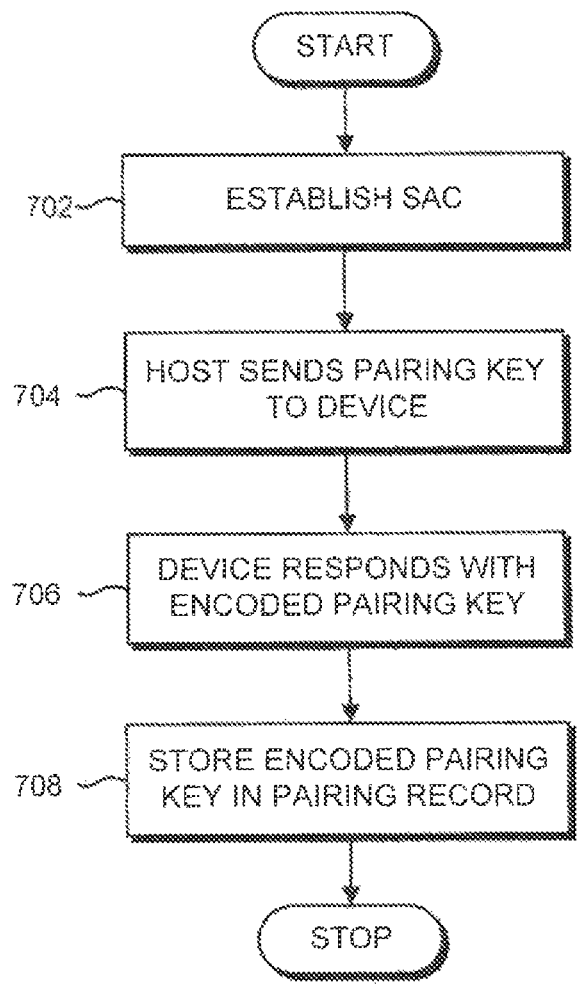
FIG. 7 is a flowchart illustrating a process for establishing a pairing between a host and a tethered device.

FIG. 7 is a flowchart illustrating a process for establishing a new pairing between a host and a tethered device, and is performed if no pairing record can be found for the particular host-device pair. As shown in FIG. 7, the host and the device establish a secure authenticated channel (e.g., as described above in connection with FIG. 6) (702). Next, the host sends a pairing key to the device (704). The tethered device responds with an encoded pairing key (e.g., a key encoded with a secret value known only to the tethered device) (706). The encoded pairing key is then stored in a pairing record for future use (708), examples of which are described in more detail below.

Nodes and Links

In one embodiment, the device's DRM system (and/or an application, such as a player application, running on the device that implements some DRM functionality) uses nodes and links similar to the node and link objects described in the '693 application. Links are used, as described in the '693 application, to establish paths to or from the node that represents the device and any number of other nodes.

In one embodiment, nodes are referenced using 128-bit node identifiers. For nodes—such as the node representing the device itself—that correspond to nodes of the type described in the '693 application, an abbreviated node identifier can be obtained by taking the first 128 bits of the SHA-1 digest value of the corresponding full node ID, which is a UTF-8-encoded URI. This transformation will be referred to as "HashId."

As described in more detail in the '693 application, a link represents a path between a 'from' node and a 'to' node. A collection of links represents a graph, where each link is a directed vertice between two nodes. A node, N, is said to be reachable if there exists a set of links that create a path between the device's own node and the node N.

Exporting a License from a Host to a Tethered Device

Figure 8:
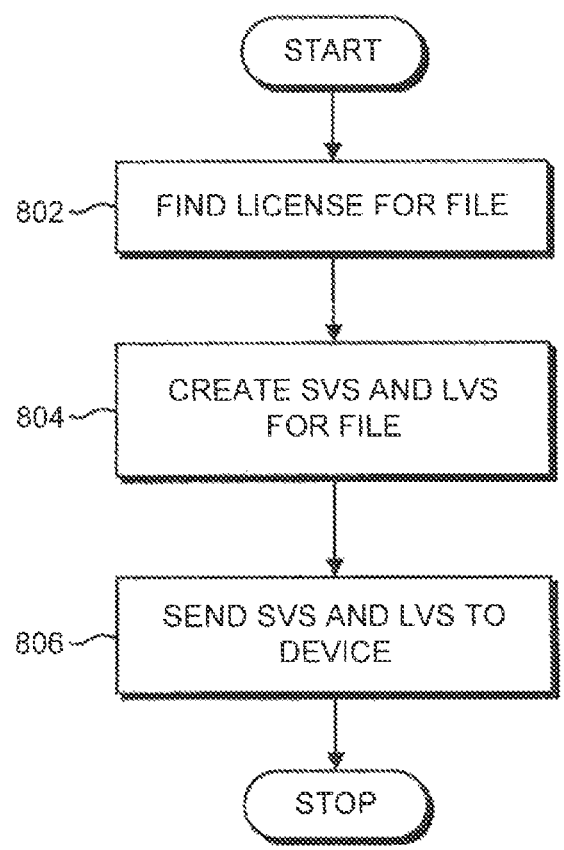
FIG. 8 is an illustration of an example process for exporting a license from a host to a tethered device.

As shown in FIG. 8, when a host wishes to send a protected file to a tethered device to enable the tethered device to use the file, the host first locates the license(s) associated with the file and determines whether such an operation is allowed by the terms of the license (802). The host then creates a simplified version of the license (e.g., an SVS), and, if necessary, a simplified version of any relevant links (e.g., LVS records) (804), and sends the simplified license and links to the tethered device (806), where, as described in more detail below, they are used by the device to govern access to the protected content. The protected content itself can be sent to the device (e.g., from the host or some other entity) independently of the license and links. A given license (and the SVS and LVS records derived therefrom) can be used to govern multiple pieces of content.

Figure 9:
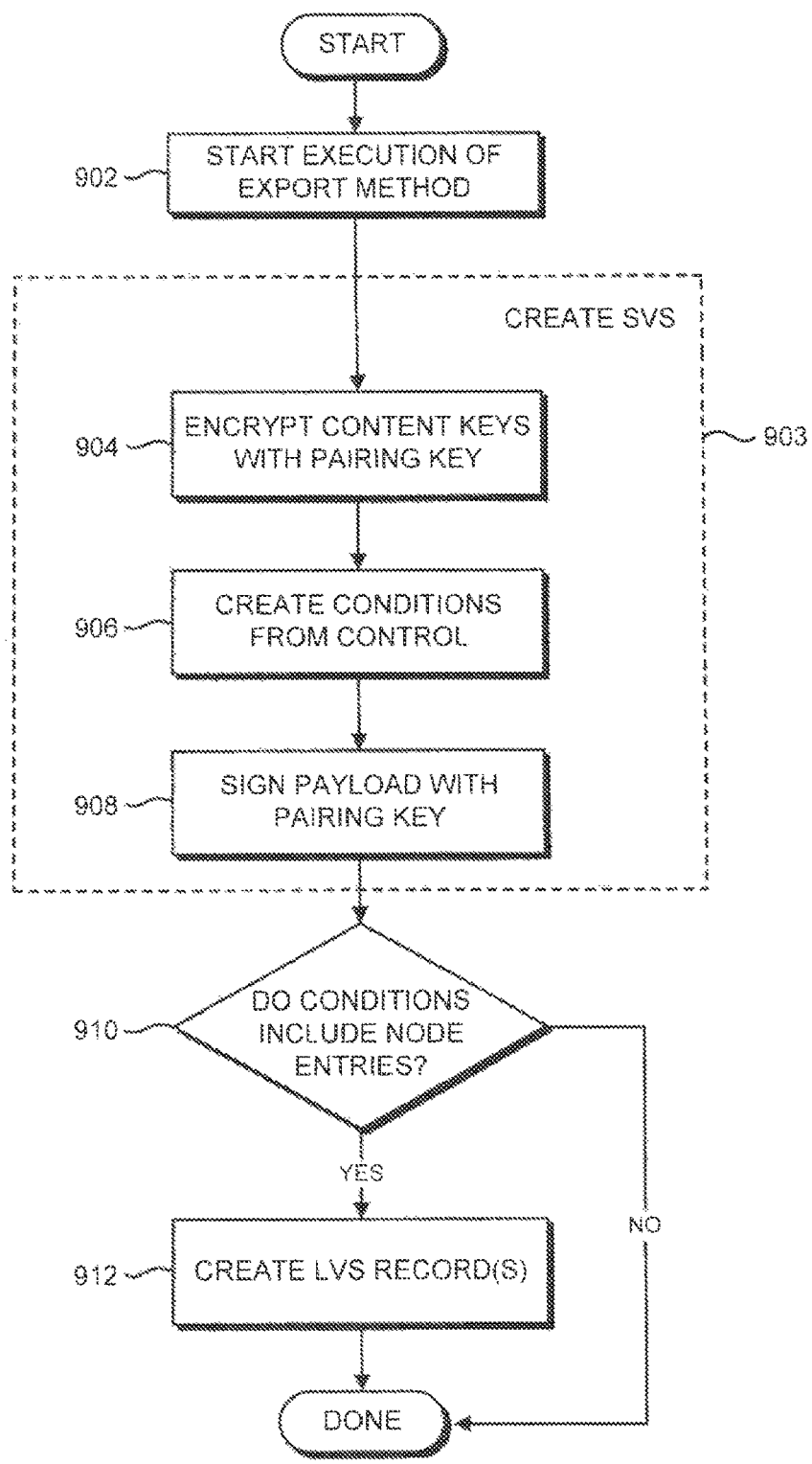
FIG. 9 is a more detailed illustration of a process for exporting a license from a host to a tethered device.

FIG. 9 is a more detailed illustration of a process for exporting a license from a host to a tethered device (e.g., a less capable device, and/or a device that implements a more primitive form of DRM) in the context of a DRM system such as that described in the '693 application. Referring to FIG. 9, once the host finds the license for the file, it executes the 'Export' method of the license, with the target system equal to the ID of the tethered device, providing the tethered device's node information as input (902). The host then creates an SVS (903) that includes the content keys for the protected file, encrypted using the pairing key for the tethered device (904). The SVS also includes a set of conditions created using the extended status block (ESB) returned by the control (906), and a signature of the SVS payload created using the pairing key (908). If the set of conditions included in the SVS include a reachability requirement (i.e., a "yes" exit from block 910), then the host creates the appropriate LVS records (912). In one embodiment, this entails invoking the ToLVS method on the link objects that may establish paths between the device's node and the relevant target nodes (e.g., a domain node). As described in more detail below, in one embodiment the LVS records contain conditions created from the ESB returned by the control, and a signature of the LVS payload, created using the pairing key.

Creating SVS and LVS Records

As previously indicated, in one embodiment, when a host wants to export protected content to a device, it uses the Export action of the appropriate content license (e.g., a license of the type described in the '693 application) to create SVS and LVS records corresponding to the content license. In a preferred embodiment, the SVS may include a number of conditions that must be satisfied in order to make use of a corresponding piece of protected content. In some embodiments, these conditions may include conditions relating to (a) the time at which the content is being used (e.g., not before a certain time and/or not after a certain time), (b) the types of output supported by or active on the targeted device (e.g., whether certain interfaces for copying the rendered content are active), (c) the reachability of various nodes (e.g., a domain node, a subscription node, and/or the like), and/or (d) the value of various states (e.g., states indicating membership in a club, the previous performance of certain actions, etc.). It will be appreciated that in other embodiments, other sets of conditions could be used.

In one embodiment, the host provides the following action parameters as arguments to the Export action:

| Name | Type | Description |
| --- | --- | --- |
| TargetNode/Id | String | Node Id of the target device |
| TargetNode/Attributes | ValueList | Attributes of the target device's node. This container may be omitted if the node has no attributes. |

If the Export is granted (e.g., if the license permits itself to be exported to the particular target device), the ESB returned by the license's control will contain the following information:

| Name | Type | Description |
| --- | --- | --- |
| ExportInfo | ValueList | List of conditions constructors. Each value in the list is a conditions constructor. |

A conditions constructor is of type ValueList, and each value in the list is of type parameter. In one embodiment, the following parameters are defined:

| Name | Type | Description |
| --- | --- | --- |
| NotBefore | Date | Date before which the SVS is not valid |
| NotAfter | Date | Date after which the SVS is not valid |
| OutputControl | ValueList | Optional list of two integer values: (i) the value of the outputControlValue field for the condition, and (ii) the value of the outputControlMask field for the SVS. |
| MustReachNodes | ValueList | Optional list of strings that each contain the uid of a node object that must be reachable. Each value in the list is of type string. |
| States | ValueList | Optional list of one or more StateIdBlock. Each StateIdBlock is a ValueList with two 16-byte ByteArray values: |

| Type | Description |
| --- | --- |
| ByteArray | 128-bit group ID (gid) expressed as an array of 16 bytes in big-endian byte order, identifying a relevant state. |
| ByteArray | 128-bit value ID (vid) expressed as an array of 16 bytes in big-endian byte order, providing the value for the state identified by the gid. |

The host uses the conditions constructor to create the "validity" field of the SVS record corresponding to the license that is being exported. The "validity" field is a conditions record.

The host uses the fields of the conditions constructor to create a conditions record as follows:
  The 'notBefore' and 'notAfter' fields of the conditions record are set to the value of the 'NotBefore' and 'NotAfter' parameters of the constructor.
  If the constructor has a 'states' parameter, the 'states' field of the conditions record is the list of tuples obtained from the list of pairs of StateIdBlock values. Otherwise the 'states' field of the conditions record is an empty list.
  If the constructor has a 'MustReachNode' parameter, the 'nodes' field of the conditions record is a list of 128-bit node identifiers created from this parameter's value by converting each string in the list to a 128-bit identifier using the HashId function. Otherwise the 'nodes' field of the conditions record is an empty list.
  If the constructor has an "OutputControl" parameter, the outputControlValue and outputControlMask fields are obtained from the parameter. Otherwise, the outputControlValue and outputControlMask fields are set to 0.

An LVS is constructed from a link object. For links that do not have a control (e.g., because they are unconditionally valid), the corresponding LVS has a constraint record where the notBefore field is set to 0, the notAfter field is set to 2^32-1, and the nodes and states fields are empty lists.

For links that have a control (e.g., links whose validity depends on certain conditions), the host obtains the fields of the corresponding LVS record by calling a specific method in the control of the link object. In one example embodiment, the method name is Control.Link.Constraint.ToLVS, and has the following characteristics:
  Input: none
  Output: returns a ResultCode and a StatusBlockPointer on the top of the stack. Where:
  ResultCode is an integer value. The result value is zero if the routine was able to run or a negative error code if an error occurred. Note that a success ResultCode (0) does not mean that the constraint is satisfied. It only means that the routine was able to run without error. It is the StatusBlock that indicates whether the constraint is satisfied.
  StatusBlockPointer is an address of a Standard ExtendedStatusBlock (as described, for example, in the '693 application).

In one embodiment, if ResultCode is not zero, the DRM engine considers that no LVS record can be created to represent that link.

If the control grants the conversion to an LVS, it returns the LVS description in the ESB in the following parameter:

| Name | Type | Description |
| --- | --- | --- |
| ConversionInfo | ValueList | List of LVS constructors. Each value in the container is an LVS constructor. |

An LVS constructor is of type ValueList and preferably has the same structure as the SVS constructor described above.

Figure 10:
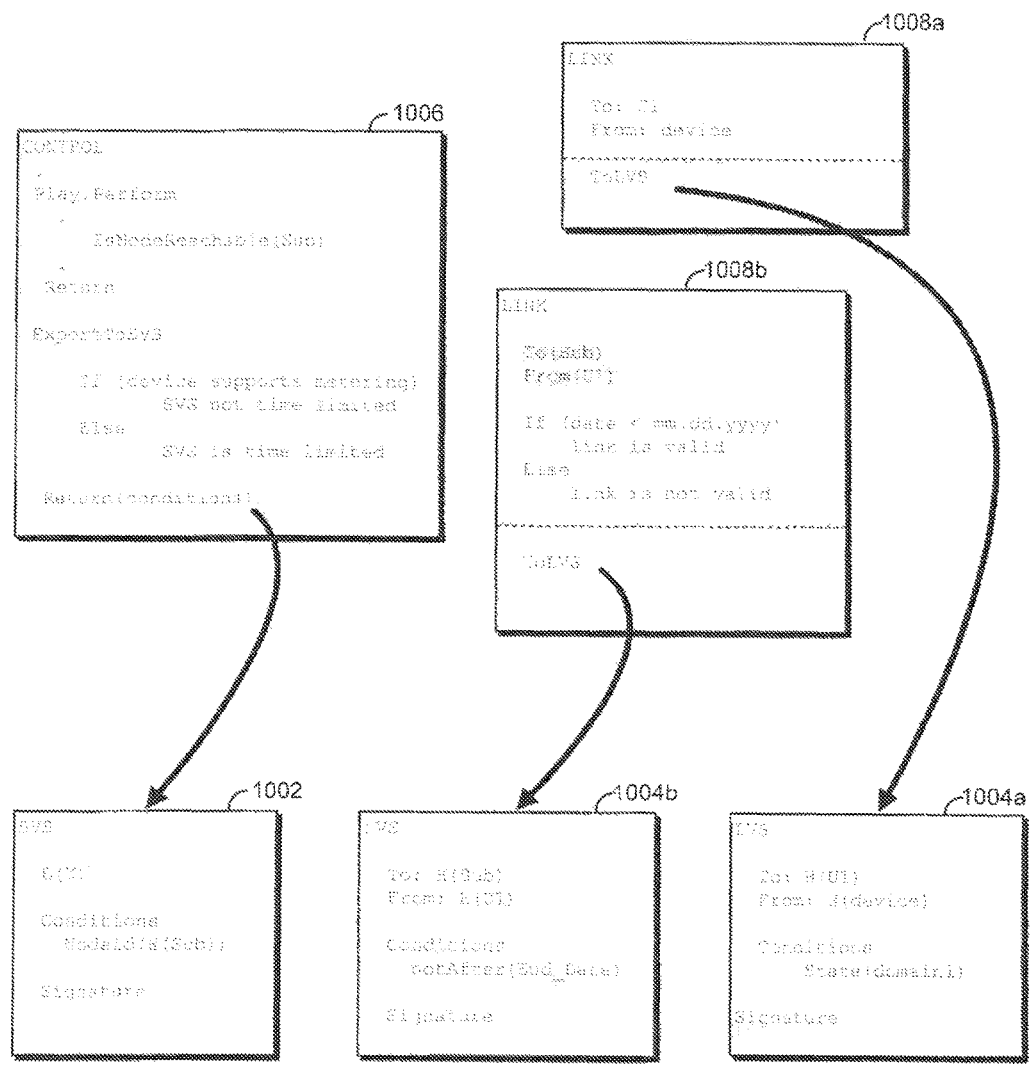
FIG. 10 illustrates the creation of SVS and LVS records from license and link objects.

FIG. 10 illustrates the creation of SVS 1002 and LVS records 1004*a*, 1004*b* from a DRM license 1006 and link objects 1008*a*, 1008*b*. In the pseudo-code example shown in FIG. 10, license 1006 includes a requirement that a particular node—e.g., a node, "sub", associated with a user's subscription to a content provider's service—be reachable in order for a device to be able to access the content to which the license corresponds. The host has a set of links 1008*a*, 1008*b* that establish a path from the tethered device to the subscription node; however, link 1008*b* is only valid until a specified date, as determined by control code included in, or referenced by, link 1008*b*. The license's export method also indicates that if the tethered device supports metering, it is ok to create an SVS that does not include an expiration date;

otherwise, an expiration date must be included. Alternatively, or in addition, the license could impose other conditions on granting permission to export, such as a condition the target device satisfy certain output control conditions (e.g., that certain types of outputs are disabled, or capable of being disabled, or are not present). If the conditions on exporting to the target device are satisfied, SVS 1002 and LVS records 1004a, 1004b are created. SVS 1002 includes the encrypted content decryption key (E(k)), a conditions record identifying node sub (e.g., using its HashID), and a digital signature. In this example, it is assumed that the device supports metering, so no time limitation is placed on the SVS. Because SVS 1002 identifies node "sub", LVS records 1004a, 1004b are created using the LVS constructors in links 1008a, 1008b. LVS record 1004a indicates that a user node, u1, is reachable from the device's node, and also includes a conditions record indicating that the link is only valid if the device has a state object that indicates that the device belongs to the user's domain. In this example, the inclusion of this condition in the LVS is dictated by the LVS constructor in link 1008a. Similarly, LVS record 1004b indicates that the subscription node is reachable from user node, u1, but that the link is only valid if the current date is before the specified end date. Thus, in this example, the target device can establish a path to the desired node, and, assuming each LVS record is valid (e.g., because the link to the subscription has not expired and because the device is still part of the user's domain), the condition contained in SVS 1002 will be satisfied. In a preferred embodiment, the SVS is stored in a database (svs.db) on the target device, and another database (svsloc.db) is maintained containing information that facilitates locating the appropriate SVS for a given piece of content.

Client Playback

Upon receipt of a simplified license (e.g., one or more LVS and/or SVS, as described above), the client can initiate playback of the content to which the simplified license relates.

Figure 11:
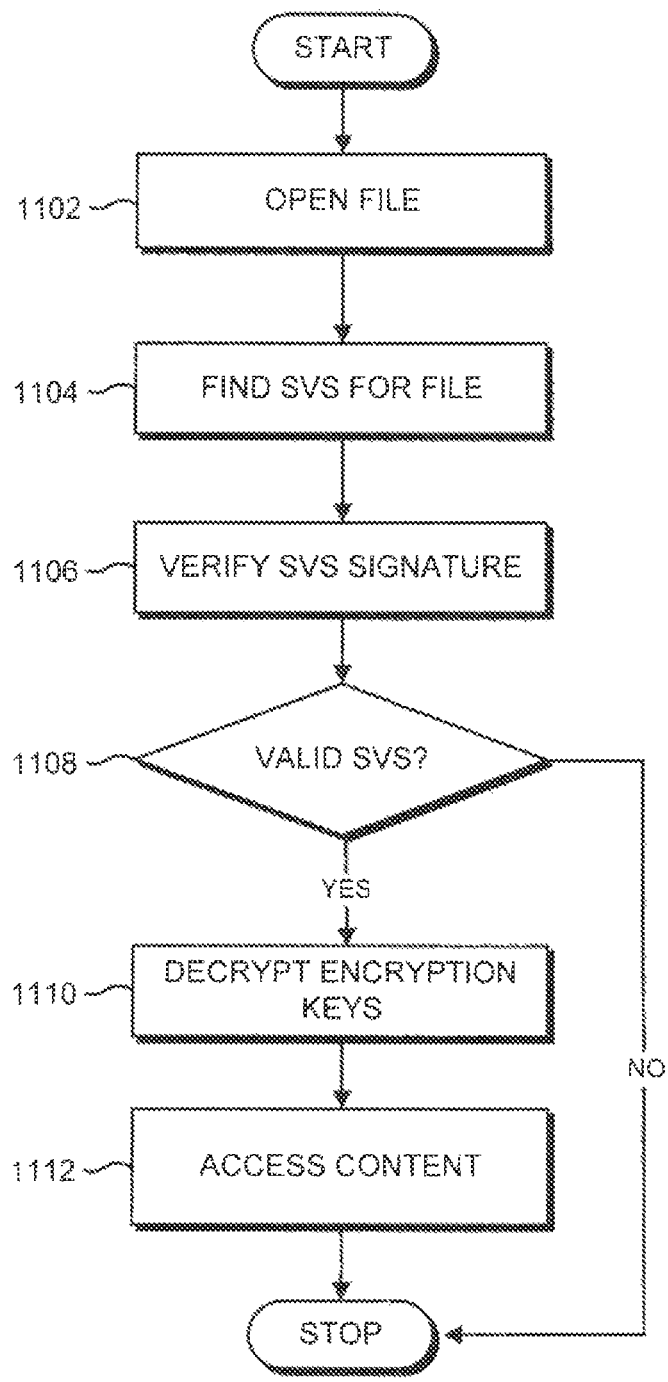
FIG. 11 shows an illustrative sequence of actions performed by a client in order to render a piece of protected content.

FIG. 11 shows an illustrative sequence of actions performed by a client in order to play (or otherwise render) a piece of protected content contained in a protected file. As shown in FIG. 11, the device opens the file (1102), and parses it to obtain the content ID or IDs. For the sake of illustration, assume that the file comprises two streams: (CID0, CID1). The device uses svsloc.db to find the SVS ID of the SVS for the content IDs, and then uses the svs.db to find the SVS record for the SVS ID (1104). The device then parses the SVS, and verifies the SVS's signature (1106). In one embodiment, this entails getting the SVS pairing id from the SVS signature, use the pairing.db to find the pairing record for this SVS, computing the pairing key value for this pairing (PK0), and verifying the SVS signature using this pairing key.

Referring once again to FIG. 11, the device then determines if the SVS is valid (e.g., by checking the 'validity' field of the SVS, and evaluating the conditions expressed therein), and, if the SVS is valid (i.e., a "yes" exit from block 1108), gets the encrypted content key for each content ID (i.e., EK0, EK1), decrypts these keys with PK0 to obtain the content key values (K0,K1) (1110), and sets the output control according to the OutputControl field. At which point the device is ready to provide access to the content (1112).

Figure 12:
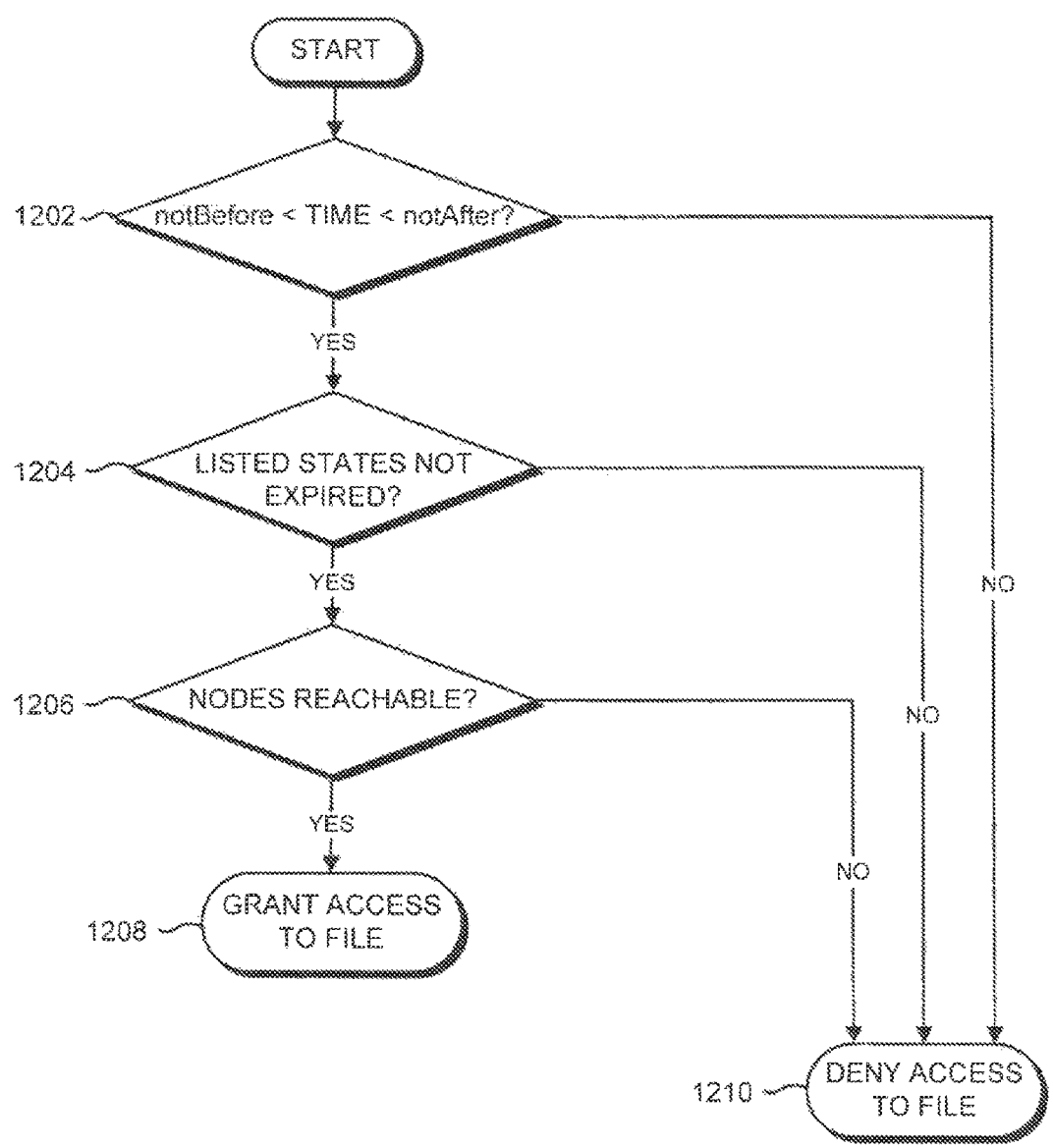
FIG. 12 is a flowchart illustrating a process for determining whether access to or other use of a piece of content is permitted by an SVS.

FIG. 12 is a flowchart illustrating a process for determining whether access or other use of a piece of content is permitted by an SVS. As shown in FIG. 12, this involves checking whether the various conditions contained in the SVS are satisfied. In the example shown in FIG. 12, this entails compare the current time with the notBefore and notAfter fields (1200), and denying access to the file if the current time is outside of the permitted range. Any states listed in the "states" list are also checked to see if they have expired (1202), and, if they have expired, access is denied. In addition, a determination is made as to whether all the nodes in the SVS's "nodes" list are reachable (1204). This may entail, for example, doing the following for each node in the list: (i) using LVS records in lvs.db to determine all the paths between the device's node and that node, and (ii) for each path, (a) checking the signature of the path's LVS records, and (b) verifying that the condition field of each LVS record indicates that it is valid. If all the signatures are verified, and all the links are valid, the node is reachable. If the conditions specified by the SVS are satisfied, the request to access or otherwise use the file can be granted (1206).

Details are provided below regarding various data structures, protocols, conventions, and implementation-specific parameters used in example embodiments that employ a DRM engine as described in the '693 application. It will be appreciated that these details are provided for purposes of illustration and not limitation, and that embodiments of the inventive body of work may make use of only some (or none) of these detailed protocols, data structures, conventions, and other implementation-specific parameters.

Data Structures

In one illustrative embodiment, the following data structures, nomenclature, and conventions are used:

Data Types

The abstract type notation used herein has the following syntax:

<name>: <type>, where <type> is of the form: <value-type> (size-in-bits) for single values, <value-type> (size-in-bits) [array-size] for arrays of values, or { . . . } for compound data structures.

The notation <type> [n] means an array of <n> elements of type <type>. The notation <type> [ ] means an array with a variable number of elements of type <type>.

In the description of various example embodiments that follows, integer values will be assumed to have been encoded using the big-endian byte order (also known as network byte order) and all bit vectors will be multiples of 8-bit bytes in big-endian byte order. Also, unless otherwise noted, time and date values will be UTC dates expressed as a 32-bit unsigned integer representing the number of minutes elapsed since Jan. 1, 1970 00:00:00 UTC. It will be appreciated that these conventions are being used for purposes of illustration and to facilitate a clear explanation of the inventive body of work, which is not limited to these illustrative encodings. Any suitable encoding conventions and time and date formats could be used.

Atoms

Atoms are simple encapsulating data structures that serve as the base for a number of specific data structures. An atom has a size, a type, and a payload. In one embodiment, the atom size is encoded as a 32-bit unsigned integer in big-endian byte order and represents the entire size of the atom, including the 8-byte header used to encode the size and the type. The type is a 32-bit identifier in big-endian byte order. By convention, the 32-bit identifier for an atom type is written as a 4-letter word, where each letter's 8-bit ASCII code is the corresponding 8-bit byte portion of the identifier. For example, the identifier value 0x61746f6d (hexadecimal) would be written 'atom', because the ASCII code for 'a' is 0x61, etc.

```
Atom: {
    header: {
        size: unsigned int (32)
        type: bit (32)
    }
    payload: unsigned int (8) [size-8]
}
```

EncryptedData

EncryptedData records contain encrypted data and information about the encryption key and algorithm.

```
EncryptedData: {
    algorithmId: unsigned int (8)
    keyInfo: KeyInfo
    cipherDataSize:     unsigned int (32)
    cipherData:         bit (8) [cipherDataSize]
}
KeyInfo: {
    keyIdType:   int (8)
    keyId:       bit (128)
}
```

Where:

"algorithmId" is an identifier of the encryption algorithm used to encrypt the data. In one embodiment, the following algorithm identifier is defined:

| Algorithm Identifier | Name | Description |
| --- | --- | --- |
| 0 | AES_128_CBC | AES symmetric encryption (as defined, e.g., by NIST in "Recommendation of Block Cipher Modes of Operation," NIST Special Publication 800-38A) with 128 bit keys in cipher block chaining mode (CBC). A 128 bit initialization vector prefixes the ciphertext. In one embodiment, the padding is done according to "Cryptographic Message Syntax", IETF RFC 2630, June, 1999. |

"KeyInfo" identifies which key is required to decrypt the data.

"cipherDataSize" is the size in bytes of the encrypted data.

"cipherData" is the encrypted data.

"KeyInfo" records contain information necessary to uniquely identify a key.

"keyIdType" specifies what the keyId identifier refers to. In one embodiment, at least the following type is defined:

| Type | Name | Description |
| --- | --- | --- |
| 0 | PAIRING | The key identifier is a pairingId, specifying that the key is the pairing key for the pairing referenced by pairingId. |

"keyed" is a unique key identifier.

Signature

Signature records contain the signature for some data payload and information about the signature key and algorithm.

```
Signature: {
    algorithmId:        unsigned int (8)
    keyInfo:            KeyInfo
    signatureDataSize:  unsigned int (32)
    signatureData:      bit (8) [signatureDataSize]
}
```

Where:

"algorithmId" is an identifier of the signature algorithm used to sign the data. In one embodiment, at least the following algorithm identifier is defined:

| Algorithm Identifier | Name | Description |
| --- | --- | --- |
| 0 | SHA1_HMAC | HMAC keyed hash algorithm using the SHA-1 hash algorithm (e.g., as described in "HMAC: Keyed-Hashing for Message Authentication", IETF RFC 2104, February, 1997). |

"keyInfo" identifies which key was used to sign the data.

"signatureDataSize" is the size in bytes of the signature data.

"signatureData" is the signature data.

Conditions Records

Conditions records represent basic validity conditions.

```
Conditions: {
    notBefore:      unsigned int (32)
    notAfter:       unsigned int (32)
    nodes: {
        nodeIdCount:    unsigned int (8)
        nodeIds:        bit (128) [nodeIdCount]
    }
    states: {
        stateIdCount:   unsigned int (8)
        stateIds:       StateId[idCount]
    }
}
StateId: {
    gid: bit (128)
    vid: bit (128)
}
```

Each field in this record is an individual sub-condition. The condition is said to be satisfied if and only if all its sub-conditions are met.

Where:

"notBefore" is a sub-condition that is met if and only if the current date is concurrent with or later than the specified date.

"notAfter" is a sub-condition that is met if and only if the current date is before or concurrent with the specified date.

"nodes" is a list of zero or more node IDs. In this example embodiment, each node ID is a 128-bit identifier. This sub-condition is met if and only if all the nodes with IDs that are listed can be reached.

"states" is a list of zero or more state IDs. Each state ID is a (gid, vid) tuple, where gid and vid are both 128-bit identifiers. A state ID uniquely identifies a state object. This sub-condition is met if and only if all the state objects in the list exist and have not expired.

SVS Records

An SVS record represents a Simple Validity Statement, and is used to express the usage rules that apply to one or more keys associated with content IDs.

In one embodiment, an SVS record has the following data structure:

```
SVS: {
        payload: {
                svsId:            bit (128)
        keyCount: unsigned        int (32)
                keys:             EncryptedKey [keyCount]
                usageRule:        {
        validity:         Conditions
        outputControl:    {
            outputControlValue: bits (32)
            outputControlFlags: bits (32)
        }
    }
        }
        signature: Signature
}
EncryptedKey: {
    contentId:        bit (128)
    keyData:          EncryptedData
}
```

Where:

"svsId" is a unique identifier for an SVS record.

"keyCount" is the number of keys in the keys array.

"keys" an array of one or more EncryptedKey records. Each EncryptedKey record contains a content ID and the corresponding content key encrypted with a pairing key.

"usageRule" is a description of the rules that govern the use of the keys carried in the SVS. In one embodiment, to use the keys, the validity conditions must be met, and the output control requirements must be implemented.

"outputControlValue" are bit fields indicating the value of zero or more output control fields. In one embodiment, the fields are encoded as follows:

| Bit range (0 is the least significant bit) | Output Control Technology | Field name |
|---|---|---|
| 0 | BasicCCI | DigitalOnlyToken |
| 5 | BasicCCI | EPN |
| 6...7 | BasicCCI | CCI |
| 8 | BasicCCI | ImageConstraintToken |
| 9...10 | BasicCCI | APS |
| 11 | DTCP | RetentionMoveMode |
| 12...14 | DTCP | RetentionState |
| 15 | DTCP | EPN |
| 16...17 | DTCP | DTCP_CCI |
| 18 | DTCP | ImageConstraintToken |
| 19 | DTCP | APS |

"outputCantrolFlags" is a bit vector of flags indicating which fields are signaled in the outputControlValue. When the bit flag for a field is set to 1, it indicates that the corresponding field in the outputControlValue is signaled. In one embodiment, the bits for the fields of outputControlValue that are not signaled are set to 0.

| Flag Bit (0 is the least significant) | Output Control Technology | Field Name |
|---|---|---|
| 0 | BasicCCI | DigitalOnlyToken |
| 1 | BasicCCI | EPN |
| 2 | BasicCCI | CCI |
| 3 | BasicCCI | ImageConstraintToken |
| 4 | BasicCCI | APS |
| 5 | DTCP | RetentionMoveMode |
| 6 | DTCP | RetentionState |
| 7 | DTCP | EPN |
| 8 | DTCP | DTCP_CCI |
| 9 | DTCP | ImageConstraintToken |
| 10 | DTCP | APS |

"signature" is a signature of the payload portion of the record.

LVS Records

An LVS record represents a Link Validity Statement. A Link represents a path between a 'from' node and a 'to' node.

In one embodiment, an LVS record consists of the following data structure:

```
LVS: {
        payload: {
                from:             bit (128)
                to:               bit (128)
                validity: Conditions
        }
        signature: Signature
}
```

Where:

"from" is a node identifier.

"to" is a node identifier.

"validity" is a conditions record that determines the constraints that must be satisfied in order for this LVS to be considered valid.

"signature" is a signature of the payload portion of the record.

FileLocator Records

A FileLocator record associates an SVS with the name of the file from which that SVS was created.

In one embodiment, a FileLocator record has the following data structure:

```
FileLocator: {
    svsId:            unsigned int (128)
    fileNameSize:     unsigned int (32)
    fileName:         bit (8) [fileNameSize]
}
```

Where:

"svsId" is the SVS ID.

"fileNameSize" is the number of characters in fileName.

"filename" is the name of the file, relative to the root of the file system on which it is located.

SvsLocator Records

An SvsLocator record associates a content ID with an SVS that contains an EncryptedKey with that content ID.

In one embodiment, an SvsLocator record has the following data structure:

```
SvsLocator: {
    contentId:   unsigned int (128)
    svsId:       unsigned int (128)
}
```

Where:
"contentId" is the content ID.
"svsId" is the SVS ID.

Data Atom

Data atoms are used to encode generic data payloads.

```
Data: extends Atom('data') {
    payload: bit (8) [ ]
}
```

Where "payload" refers to zero or more payload bytes.

Pairing Records

Pairing records contain information that enables the device and the host to compute a pre-shared pairing key. Pairing keys are used to encrypt content keys and sign other records.

```
PairingKey: {
    pairingId: bit (128)
    encodedPairingKeySize: unsigned int (32)
        encodedPairingKey:   bit (8) [encodedPairingKeySize]
}
```

When a host encounters a device and there does not exist a pairing record for this host-device pair, the host obtains the payload to be stored in the pairing record from the device and inserts the pairing record into the pairing record database. The pairing key in the pairing record is encoded by the device (typically, that means encrypted with a device secret key that is never shared with any other entity). If the device chooses to encode all pairing keys by encrypting them with a single device secret key, the device is able to compute the values of all the pairing keys without having to perform asymmetric cryptographic operations.

When communicating with a device, the host obtains the value of the current pairing's EncodedPairingKey in the response to a SetPairingKey request.

Request Records

Request records encode a request from the host to the device.

```
Request: extends Atom('rqst') {
    commandId: unsigned int (32)
    commandParameters: Atom [ ]
}
```

Where "commandId" is an identifier of the command to be executed, and "commandParameters" refers to zero or more atoms containing the command's parameters.

In one embodiment, the following commands are defined:

| Command Identifier | Name |
|---|---|
| 0 | CMD_SET_PAIRING_KEY |
| 1 | CMD_GET_TRUSTED_TIME |
| 2 | CMD_SET_TRUSTED_TIME |
| 3 | CMD_GET_STATE_OBJECT_BY_ID |
| 4 | CMD_GET_STATE_OBJECT_BY_INDEX |
| 5 | CMD_GET_STATE_OBJECT_COUNT |
| 6 | CMD_SET_STATE_OBJECT |
| 7 | CMD_DEL_STATE_OBJECT |
| 8 | CMD_GET_CRL_NUMBER |
| 9 | CMD_SET_CRL_NUMBER |

Response Records

Response records encode a response from the device to the host.

```
Response: extends Atom ('rspn') {
    status: unsigned int (32)
    responseElements: Atom [ ]
}
```

Where "status" is a status code indicating whether the request to which this response corresponds succeeded or failed, and "responseElements" refers to zero or more atoms containing the response data. The atoms may include an Info atom containing textual information related to the response status. In one embodiment, the following status codes are defined:

| Status Code | Name | Description |
|---|---|---|
| 0 | SUCCESS | The request succeeded |
| 1 | FAILURE | Generic failure. This code is used if no other specific status codes can be used. |
| 2 | ERROR_OUT_OF_RESOURCES | The request failed because the responder failed to allocate or access a necessary resource, such as memory or file handles. |
| 3 | ERROR_PROTOCOL_FAILURE | The request failed because of a protocol failure, such as receiving an invalidly-formatted data structure. |
| 4 | ERROR_NOT_SUPPORTED | The request failed because the requested operation is not supported by the responder. |
| 5 | ERROR_NOT_UNDERSTOOD | The request failed because the responder does not understand the request (the commandId is not known by the responder). |
| 6 | ERROR_NO_SUCH_ITEM | The request failed because an item or element necessary for the completion of the request does not exist. |

Messages

In one embodiment, the host and the device communicate using a request/response pattern. The entity that sends a request is the requester, and the entity that receives the request and sends back a response is the responder. In this context, the host is typically the requester and the device is the responder. For each request sent by the requester, the responder sends back a response, which can be a normal response indicating that the request was received and processed successfully, or a response indicating that an error occurred.

In one embodiment, if the responder receives a request with a command that it does not understand, it responds with an ERROR_NOT_UNDERSTOOD status code. If the responder receives a request with a command that it understands but does not support, it responds with an ERROR_NOT_SUPPORTED status code. If the responder detects an error in the format of the request, it responds with an ERROR_PROTOCOL_FAILURE.

If the requester receives a response with a status code that it does not understand, it treats it as a failure condition and assumes that the request did not succeed. If the requester receives a response with a status code that it does understand, but that contains, in addition to the mandatory response elements, some response elements that it does not understand, it ignores those extra response elements.

Security Data Update

The host can query and update the security data of the device. Security data includes the value of trusted time.

Trusted time values are UTC time values expressed as the number of seconds elapsed since Jan. 1, 1970 00:00:00 UTC.

The following commands are used for this purpose:
GetTrustedTime
Request:
commandId: CMD_GET_TRUSTED_TIME
parameters: None
Response:
responseElements: a single Data atom containing the following data:

```
{
    time: unsigned int (32)
}
```

Where "time" is the value of the responder's trusted time.
Description: Gets the device's trusted time.
SetTrustedTime
Request:
commandId: CMD_SET_TRUSTED_TIME
parameters: a single Data atom containing the following data:

```
{
    time: unsigned int (32)
}
```

Where "time" is the value of the time to which the responder must update its trusted time.
Response:
responseElements: None
Description: Sets the device's trusted time.
GetCrlNumber
Request:
commandId: CMD_GET_CRL_NUMBER
parameters: None
Response:
responseElements: a single Data atom containing the following data:

```
{
    crl_number: bit (8) [ ]
}
``` crl_number: byte array representing the CRL number, e.g., encoded as an ASN.1 INTEGER as specified in "Internet X.509 Public Key Infrastructure—Certificate and Certificate Revocation List (CRL) Profile", IETF RFC 3280, April 2002 (RFC 3280).
Description: Gets the Device's current CRL number.
SetCrlNumber
Request:
commandId: CMD_SET_CRL_NUMBER
parameters: a single Data atom containing the following data:

```
{
    crl_number: bit (8) [ ]
}
```

Where crl_number is a byte array representing the CRL number encoded as an ASN.1 INTEGER as specified in RFC 3280.
Response:
responseElements: None
Description:
Sets the Device's CRL number. In one embodiment, a device must reject any CRL number lower than the current value of its CRL number (and return FAILURE).

Figure 13:
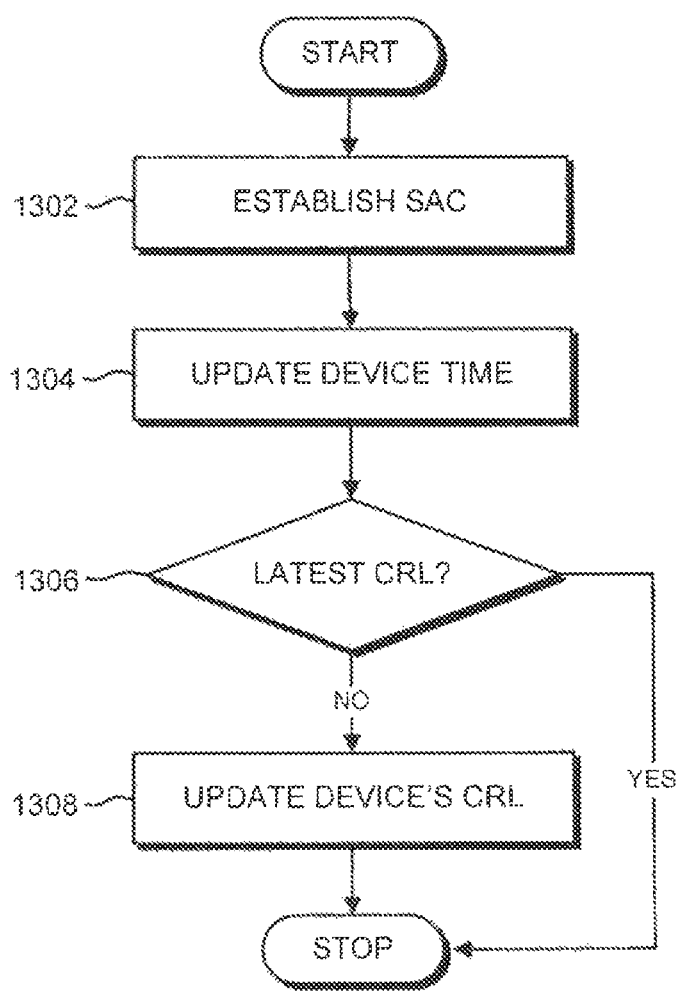
FIG. 13 shows an example process that could be performed by a host to update the security data of a tethered device.

FIG. 13 shows an example process that could be performed by a host to update the security data of a tethered device. As shown in the host establishes a secure authenticated channel with the device (1302). The host can then update the device's time using, e.g., the SetTrustedTime command (1304), and check that the device has the latest CRL (1306). If the device does not have the latest CRL (i.e., a "no" exit from block 1306), the host can update the device's CRL (e.g., in crl.bin) (1308).

Device State

A device manages a set of state objects. These objects are preferably managed in a way that cannot be tampered with, and such that it is not possible to create, delete, or change state objects other than as allowed by the system's specification.

In one embodiment, each state has a group ID, a value ID, a value, and an optional expiration date. The value is a 32-bit unsigned integer.

In one embodiment, the device only needs to check the existence or not of state objects. It does not create or delete state objects unless instructed to do so by a host request, and it neither reads nor changes state object values unless instructed to do so by a host request. A device may, however, make use of the state objects' expiration dates to free internal resources associated with the storage of such values. For example, expired state objects may be garbage-collected by the device.

The host can create, delete, read the value of, and change the value of state objects stored on the device by sending command requests to the device.

In one embodiment, the following commands are used for state management:

GetStateObjectById
Request:
commandId: CMD_GET_STATE_OBJECT_BY_ID
parameters: a single Data atom containing the following data:

```
{
    gid: bit (128)
    vid: bit (128)
}
```

Response:
responseElements: If the device has an object with the requested gid and vid, it returns a single Data atom containing the following data:

```
{
    value:       bit (32)
    expiration: unsigned int (32)
}
```

Description: Gets the value and expiration date of a state object managed by the device. If the device does not have a state object with the requested gid and vid, it returns a response with the status field set to ERROR_NO_SUCH_ITEM.

GetStateObjectByIndex
Request:
commandId: CMD_GET_STATE_OBJECT_BY_INDEX
parameters is a single Data atom containing the following data:

```
{
    gid:    bit (128)
    index: unsigned int (32)
}
```

Where:
"gid" is the group ID of the requested state object.
"index" is a 0-based index selecting one of the state objects with the requested gid.
Response:
responseElements: a single Data atom containing the following data:

```
{
    valueId:    bit (128)
    value:      bit (32)
    expiration: unsigned int (32)
}
```

Description: Gets the value Id, value, and expiration date of a state object managed by the device. If the device does not have a state object with the requested gid and index, it returns a response with the status field set to ERROR_NO_SUCH_ITEM.

GetStateObjectCount
Request:
commandId: CMD_GET_STATE_OBJECT_COUNT
parameters: a single Data atom containing the following data:

```
{
    gid: bit (128)
}
```

Response:
responseElements: a single Data atom containing the following data:

```
{
    count:      bit (32)
}
```

Description: Returns the number of state objects with the specified group ID. If the device does not have any state object with the requested gid, it returns a response with the status field set to ERROR_NO_SUCH_ITEM.

SetStateObject
Request:
commandId: CMD_SET_STATE_OBJECT
parameters: a single Data atom containing the following data:

```
{
    gid:   bit (128)
    vid:   bit (128)
    value: bit (32)
    expiration: unsigned int (32)
}
```

Response:
responseElements: None

DeleteStateObject
Request:
commandId: CMD_DEL_STATE_OBJECT
parameters: a single Data atom containing the following data:

```
{
    gid: bit (128)
    vid: bit (128)
}
```

Response:
responseElements: None

Accessing State Objects from the Host

The device state objects are exposed to controls running on the host through the host object interface. For example, in one embodiment the state object with the group ID <gid> and value ID <vid> is accessible under the path /Marlin/MSTD/<gid>/<vid>.

The value of the host object is an 8-byte compound data structure that encodes the state value and the expiration date (e.g., the 32-bit state value followed by the 32-bit UTC expiration date expressed in number of minutes elapsed since Jan. 1, 1970 00:00:00).

In one embodiment, the access control on this portion of the host object tree is performed as follows:

A control may only read and write a state value host object if one of the names in its identity (its identity is the collection of all the principal names bound to keys that have signed its code) matches the group ID, where the matching can be done by comparing the 128 least significant bits of the SHA-1 digest value of the principal name to the 128-bit group ID.

Pairing
SetPairingKey
Request:
commandId: CMD_SET_PAIRING_KEY
parameters: a single Data atom with the following data:

```
{
    pairingKey: bit (8) [ ]
}
```

Response:
responseElements: the device may include in the response elements a data atom with the following data:

```
{
    encodedPairingKey: bit (8) [ ]
}
```

Where "encodedPairingKey" is the pairing key encoded in a way that can be stored in a pairing record. In one embodiment, the encoded pairing key is encrypted in a way that ensures that only the device can use the encoded pairing key to compute the value of the pairing key.

TLS Binding

This binding specifies how to establish the host to device SAC using TLS.

In one embodiment, the host and the device each have an RSA private key and an X.509 certificate carrying the corresponding public key. The host and the device establish a TLS communication configured for the AES cipher suite.

Once the TLS session is established, the host and device enter a communication loop where the host sends a request atom and receives a response atom, until the host or the device terminates the session.

A more detailed description of an example implementation of a TLS binding for the secure authenticated channel (SAC) referred to previously herein is provided below. The binding specified in this example is a profile of Dierks et al., "The TLS Protocol Version 1.0", IETF RFC 2246, January 1999, with a very limited set of options optimized for maximum interoperability between MSTD hosts and devices and ease of implementation.

Binding Description

In one embodiment, a device that supports this security binding must advertise it in its device description document. In one embodiment, the <Binding> element corresponding to this security binding is defined as follows:
type Urn:marlin:tethered:1-0:tls In one embodiment, one and only one <Option> element must be present:

| name | CipherSuite |
|---|---|
| Value | TLS_RSA_WITH_AES_128_CBC_SHA |

TLS Profile

Figure 14:
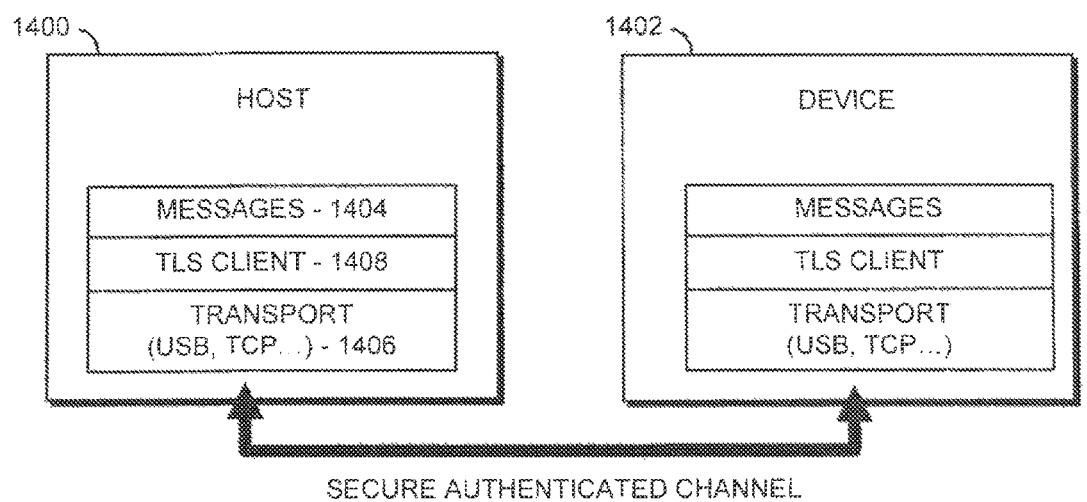
FIG. 14 shows an implementation of TLS between a host and a tethered device.

FIG. 14 shows an implementation of TLS between a host 1400 and a tethered device 1402, and illustrates how the communication between the host 1400 and the device 1402 can be layered.

As shown in FIG. 14, the application layer 1404 on top is composed of one or more messages of the type described above. The transport layer 1406 at the bottom depends on the transport binding chosen for a given deployment. An illustrative transport binding based on USB Mass storage is described below. The middle layer 1408 adds security and authentication to the communication and is defined as a profile of TLS. In one embodiment, the host is mapped on the TLS Client and the device is mapped on the TLS Server.

In one embodiment, the only cipher suite used in this profile of TLS is: TLS_RSA_WITH_AES_128_CBC_SHA, as defined in Chown, "Advanced Encryption Standard (AES) Ciphersuites for Transport Layer Security (TLS)", IETF RFC 3268, June 2002. The cipher suite chosen implies that the authentication and key exchange algorithm is RSA. In a preferred embodiment, Temporary RSA keys are not used. This also implies that the X.509 certificate of the TLS Server (i.e., the tethered device) has both the keyEncipherment and digital Signature bits set in the key usage field.

Handshake

Figure 15:
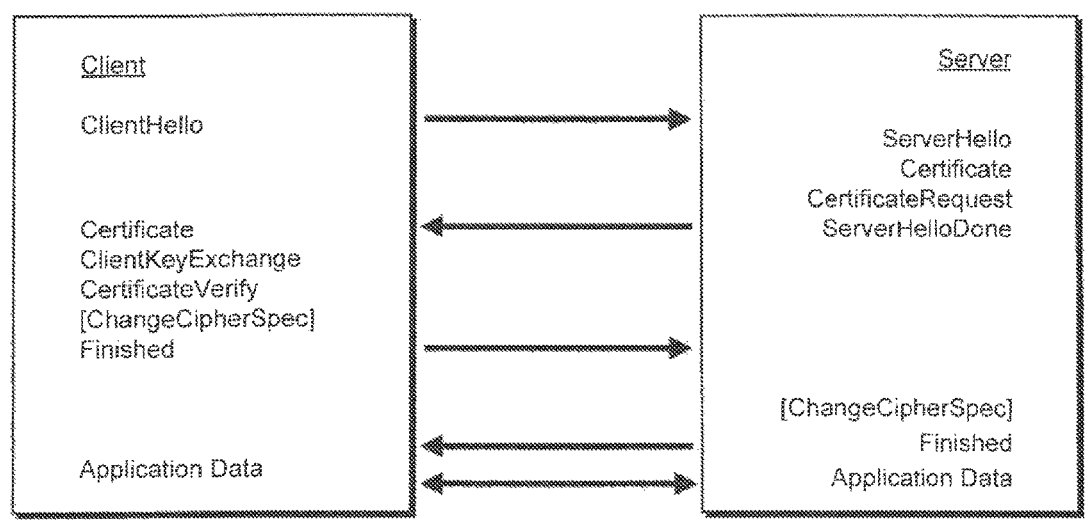
FIG. 15 illustrates a handshake protocol.

In the profile of TLS described above, both the TLS server (i.e., the tethered device) and TLS client (i.e., the host) are authenticated. FIG. 15 illustrates a handshake protocol of this profile. In some embodiments, an abbreviated handshake may be used.

Messages

In this profile, some fields are specified in the following messages. In one embodiment, the values indicated below are mandatory unless otherwise specified.

ClientHello
  client_version: set to {3, 1} (TLS 1.0)
  cipher_suites: one element set to
    TLS_RSA_WITH_AES_128_CBC_SHA
  compression_methods: one element set to 0 (CompressionMethod.null)
ServerHello
  server_version: set to {3, 1} (TLS 1.0)
  cipher_suite: set to
    TLS_RSA_WITH_AES_128_CBC_SHA
  compression_method: set to 0 (CompressionMethod.null)
ServerCertificate
  certificate_list: contains the X.509 certificate chain of the device RSA key
CertificateRequest
  certificate_types: one element set to rsa_sign(1)
  certificate_authorities: empty if the trust anchor is fixed.
ServerHelloDone
  Nothing further specified in this profile.
ClientCertificate
  certificate_list: contains the X.509 certificate chain of the host RSA key
ClientKeyExchange
  exchange_keys: set to an RSA encryptedPreMasterSecret
CertificateVerify
  The SignatureAlgorithm is RSA.

Key Usage

In one embodiment, the tethered device key certificate must have the digital Signature and keyEncipherment bits set, and the host key certificate must have the digital Signature bit set.

USB Mass Storage Binding

Figure 16:
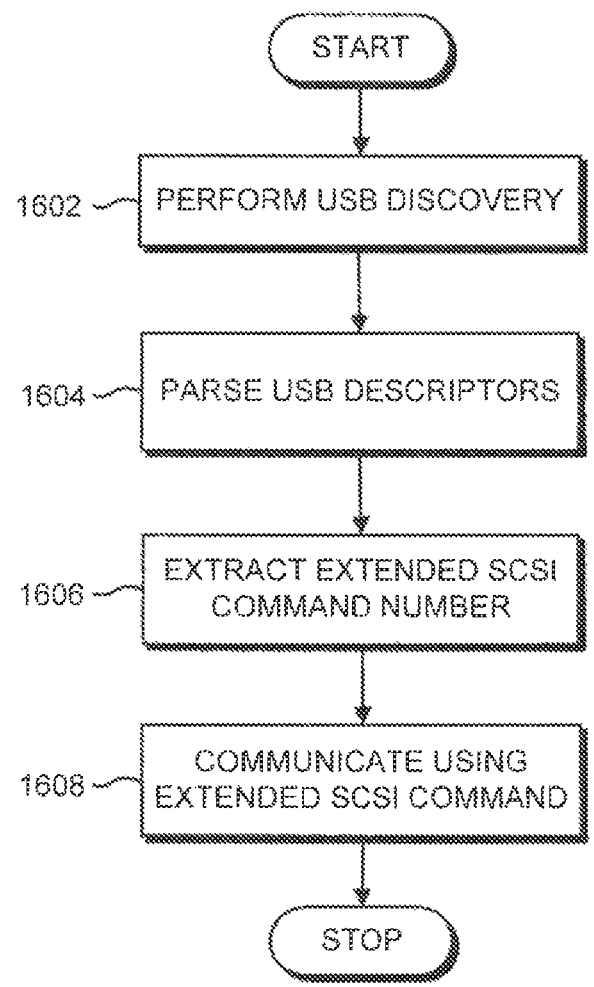
FIG. 16 shows an example process for initiating communication between a host and a tethered device over a USB connection using extended SCSI commands.

As previously indicated, in one embodiment a novel technique is used to facilitate the communication of messages such as those described above between the host and the device over a USB interface by using extended SCSI commands. Devices that support this form of communication (i.e., devices that are designed to handle the extended SCSI commands) include an indication to this effect in one of their USB descriptors. As shown in FIG. 16, a host that wishes to communicate with a tethered device in this manner will first perform a standard USB discovery/inspection process (1602) to obtain the device's USB descriptors. The host then parses the USB descriptors to see if they include an indication that this form of communication is supported by the device (1604), and, if so, which extended SCSI command(s) the device supports (1606). The host and the device can then initiate communication using the extended SCSI command(s)(1608). Additional details about example implementations are provided below.

In one embodiment, the USB mass storage binding is used to define how the system specifically applies to devices that implement the USB Mass Storage profile (e.g., as described in "Universal Serial Bus Mass Storage Class Specification Overview Revision 1.2," Jun. 23, 2003) as their primary way of exposing their content storage to their host.

It will be assumed that the device exposes a USB Mass Storage interface which provides access to a traditional file system. It will also be assumed that the tethered device may not be able to access the storage while engaged in a communication with the host.

Device Discovery

In one embodiment, a tethered device that implements this binding needs to provide a special USB descriptor to indicate the binding version and parameters by responding to a GET_DESCRIPTOR request where the Descriptor Type is STRING (0x03) and Language ID is 0. In one embodiment, it should be 255, and if the Device is unable to provide the USB descriptor at index 255, it may be any index between 1 and 255 and should choose the available index closest to 255.

In one embodiment, the string value of this descriptor is: "urn:marlin:mstd:usb-msc:1.0:<scsi-cdb-op>," where <scsi-cdb-op> is the SCSI Operation Code described below, encoded as a two character hexadecimal. For example, if the SCSI command ID chosen by the Device is 0x20, the MSTD USB descriptor string is: urn:marlin:mstd:usb-msc:1.0:20

Binding Description

In one embodiment, a device that supports this transport binding must advertise it in its device description document. In one embodiment, the <Binding> element corresponding to this transport binding is defined as follows:

| type | Urn:marlin:tethered:1-0:usb |
|---|---|

In one embodiment, <Option> elements are not defined for this binding.

SCSI Commands

In one embodiment, the host and the device communicate using SCSI commands via the same mechanism used to exchange mass storage SCSI commands. The SCSI commands used in this binding are specified in terms of Command Descriptor Blocks (CDB). An Operation Code that is not otherwise used is chosen. In one embodiment, the value of this operation code is 0x20, but may be any other unused Operation Code.

In one embodiment, the CDB is a 10-bytes long with the following fields:

| Byte | Description |
|---|---|
| 0 | OPERATION CODE |
| 1 | MSTD_COMMAND |
| 2 | (MSB) |
| 3 | |
| 4 | DATA_SIZE |
| 5 | |
| 6 | (MSB) |
| 7 | |
| 8 | |
| 9 | RETURN_SIZE_OFFSET |

Where "MSTD_COMMAND" is one of the three MSTD commands MSTD_CMD_READ (0x01), MSTD_CMD_WRITE (0x02), and MSTD_CMD_RESET (0x03).

MSTD_CMD_READ

The MSTD_CMD_READ command is used by the host to read a buffer of data from the device. For this command the DATA_SIZE field is set to the size of the buffer allocated by the host for the return buffer and RETURN_SIZE_OFFSET is set to an offset in the buffer where the device will write a 32-bit big-endian value equal to the number of bytes returned.

MSTD_CMD_WRITE

The MSTD_CMD_WRITE command is used by the host to write a buffer of data to the device. For this command, the DATA_SIZE field is set to the size of the payload written by the host, and the RETURN_SIZE_OFFSET field is set to 0.

MSTD_CMD_RESET

The MSTD_CMD_RESET command is used by the host to reset the communication state with the device. For this command, the DATA_SIZE and RETURN_SIZE_OFFSET fields are set to 0.

Sequence of Commands

The communication protocol between the host and the device is composed of sequences of TLS records and MSTD Request/Response pairs. For each record sent from the host to the device the host issues one or more MSTD_CMD_WRITE commands (if the record cannot be written in a single MSTD_CMD_WRITE command, the record is split into multiple MSTD_CMD_WRITE commands). For each record expected from the device by the host, the host issues MSTD_CMD_READ commands until a complete record has been read from the device.

If a communication error occurs (such as a not-well-formed record, a timeout, or other problem), the host may issue a MSTD_CMD_RESET command to reset the communication. In one embodiment, after the reset, the communication is restarted as if the host and the device had not exchanged any records yet.

Device Description Document

In one embodiment, the device description is stored in the device description document on the file system. In one embodiment, the filename for this document is fixed (e.g., /.marlin/device.xml, where '/' represents the root of the file system and .marlin is a directory at the root of the file system).

Root Directory

The Root Directory is a directory that contains files written by the host and read by the device. It is recommended that the root directory be a subdirectory of the directory in which the device description document is located. In one embodiment, the following files are located in the Root Directory:

svs.db: This file contains a database of SVS entries, indexed by their svsId field.

lvs.db: This file contains a database of LVS records, indexed by their from field.

svsloc.db: This file contains a database of SvsLocator entries, indexed by their contentId field.

fileloc.db: This file contains a database of FileLocator records indexed by their svsId field.

pairing.db: This file contains a database of Pairing Records, indexed by their pairingId field.

crl.bin: This file contains the current CRL.

Links Directory

In one embodiment, the host may store link objects in a links directory in order to facilitate the pairing with a different host which may not have the link objects expressing the relationships between this device's node and user nodes.

In one embodiment, this directory is named 'links' and is located in the root directory.

Database Format

In one embodiment, the database files used in this binding are very simple. They are designed to provide a fast indexed access to records, without requiring complicated parsing code on the device.

In one embodiment, the file consists of a hash table with 2^n entries, and one or more linked lists of cells. Cells contain a payload (byte array) and a chaining pointer (file offset to another cell, or zero for the last cell in a list). A key corresponds to each payload. The value of the key for a given payload depends on the payload type. In one embodiment, for each key value, an n-bit hash value is computed. This value is equal to the n least significant bits of the SHA-1 digest value of the key value. Each entry in the hash table index corresponds to one of the 2^n n-bit key hash values, and contains either zero if no cell with that key hash exists, or the 32-bit file offset of a cell with a key that has this hash. Cells can be linked together. The file starts with a header containing a description of the table (e.g., database identifier, value of 'n', etc.).

Figure 17:
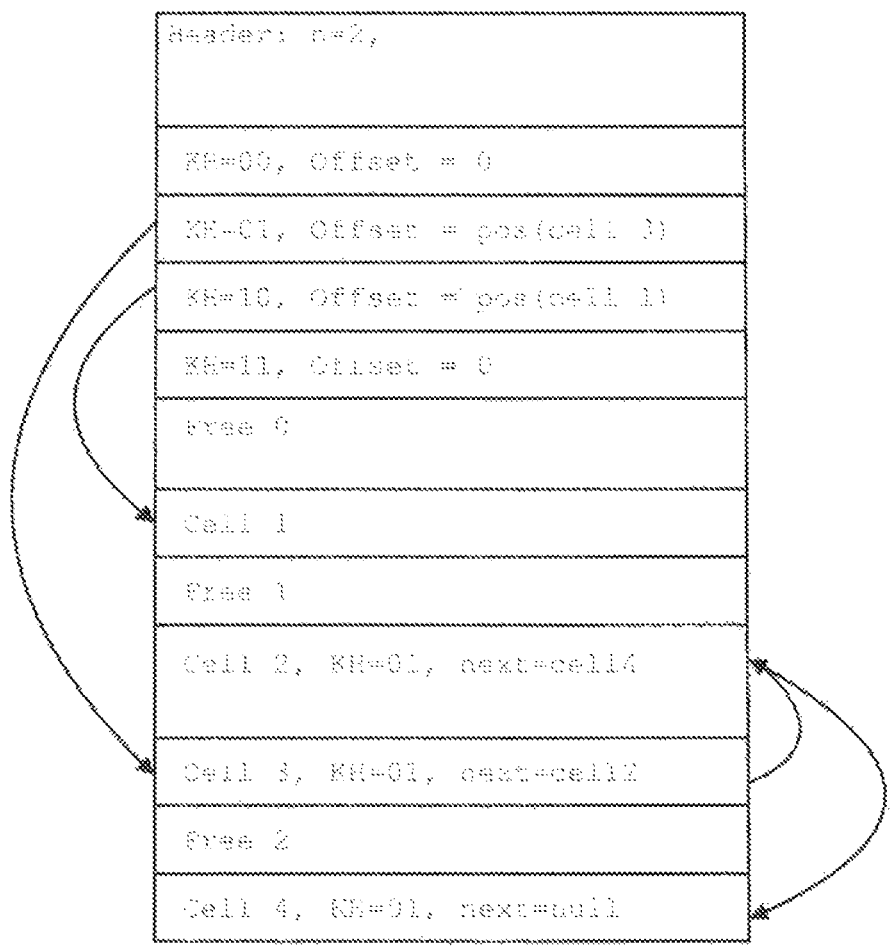
FIG. 17 shows an example of a database file layout.

FIG. 17 shows an example of a database file layout. As shown in FIG. 17, in one embodiment, a database file comprises a 'dbhd' (database header) atom, followed by a 'dbco' (cell offset table) atom, followed by one or more other top-level atoms. These other top-level atoms may include 'cell' atoms, 'free' atoms, or any other atoms. In one embodiment, all atoms not understood by the database file parser are ignored. The 'dbhd' atom is the first atom in the file, starting on the first byte of the file. The 'dbco' atom is the second atom in the file, starting on the first byte after the 'dbhd' atom. Other atoms may appear in any order.

An example structure for a DatabaseHeader atom is shown below:

DatabaseHeader Atom
Atom Type: 'dbhd'
Container: File (this is a top-level atom)
Mandatory: Yes
Quantity: Exactly one

```
DatabaseHeader: extends Atom('dbhd') {
    databaseId:      unsigned int (32)
    databaseScheme:  unsigned int (32)
}
```

Where "databaseId" is an identifier of the database. In one embodiment, the following identifiers are defined:

| Identifier | Name | Description |
|---|---|---|
| 0 | PAIRING-KEYS | Database of pairing keys. The payload of each cell contains a pairing record. Each cell has a single key value equal to the pairing record's pairingId field. |

| Identifier | Name | Description |
|---|---|---|
| 1 | SVS | Database of SVS records. The payload of each cell contains an SVS record. Each cell has a single key value equal to the SVS record's svsId field. |
| 2 | SVS LOCATOR | Database of SVS locator records. The payload of each cell contains an SVS locator record. Each cell has a single key value equal to the SVS Locator record's contentId field. |
| 3 | LVS | Database of LVS records. The payload of each cell contains an LVS record. Each cell has a single key value equal to the LVS record's from field. |
| 4 | FILE LOCATOR | Database of filenames. The payload of each cell contains the name of a file on the file system where media files are stored, relative to the root of the file system. |

An example structure for a CellOffsetTable atom is shown below:

CellOffsetTable Atom
Atom Type: 'dbco'
Container: File (this is a top-level atom)
Mandatory: Yes
Quantity: Exactly one

```
CellOffsetTable: extends Atom('dbco') {
    tableSizeExponent: unsigned int (32)
    for (i=0; i < 2^ tableSizeExponent; i++) {
        cellOffset: unsigned int (32)
    }
}
```

An example structure for a Cell atom is shown below:
Cell Atom
Atom Type: 'cell'
Container: File (this is a top-level atom)
Mandatory: No
Quantity: Zero or more

```
Cell: extends Atom('cell') {
    nextCellOffset: unsigned int (32)
    cellKeySize:    unsigned int (32)
    cellKey:        bit (8) [cellKeySize]
    payload:        bit (8) [ ]
}
```

An example structure for a Free atom is shown below:
Free Atom
Atom Type: 'free'
Container: File (this is a top-level atom)
Mandatory: No
Quantity: Zero' or more

```
Free: extends Atom('free') {
    padding: bit (8) [ ]
}
```

Domains

Figure 18:
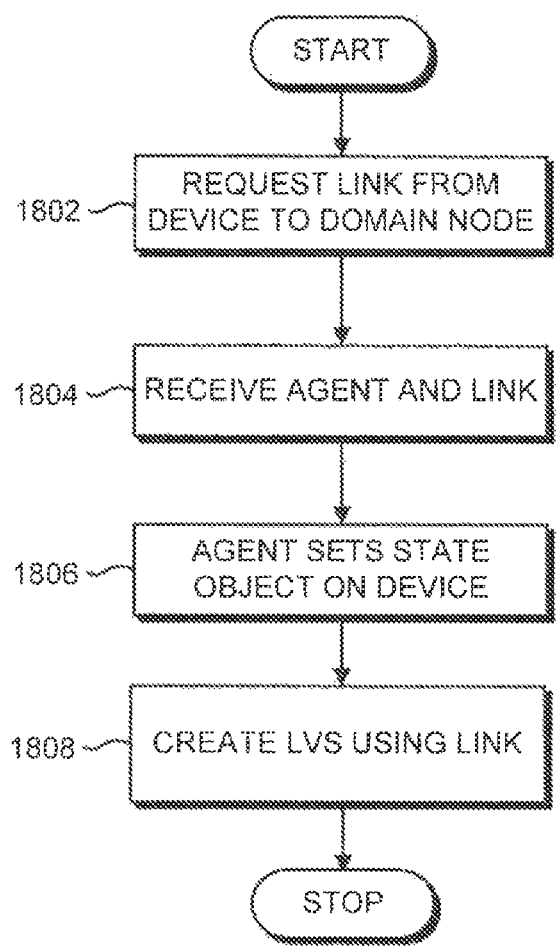
FIG. 18 shows an example of a tethered device joining a domain.

Tethered devices can be managed in a way that resembles the way other devices can be managed in a domain. FIG. 18 illustrates one such example. As shown in FIG. 18, to join a tethered device to a domain, a host application uses the DRM system's link acquisition protocol to request from the domain manager that a link between a tethered device's personality node and a user node be created (1802). In response, an agent is sent to the host (1804). When the agent runs, it sets a state object in the tethered device via the host object interface (1806). From the newly acquired link object the host creates an LVS object for the tethered device (1808). That LVS uses a condition to make the LVS's validity depend on the existence of the state object set by the agent. To leave the domain, the host would perform an unregister operation with the domain manager, which would send an agent that would delete the state object associated with this domain. Any domain license that can be converted to an SVS for a tethered device would encode as one of its validity conditions the reachability of the domain's node ID. The reachability depends on whether the device has an LVS from its own node ID to the domain node ID, and the corresponding state object set.

APPENDIX A

The following is an example of an XML schema describing the syntax of an illustrative device description document:

```
<?xml version="1.0" encoding="UTF-8"?>
<!--
    $Id: $
-->
<xs:schema targetNamespace="urn:marlin:tethered:1-0:schemas"
    xmlns:oct="http://www.octopus-drm.com/profiles/base/1.0"
    xmlns:xs="http://www.w3.org/2001/XMLSchema"
    xmlns="urn:marlin:tethered:1-0:schemas"
    elementFormDefault="qualified" attributeFormDefault="unqualified">
    <!-- imports -->
    <xs:import namespace="http://www.octopus-drm.com/profiles/base/1.0"
schemaLocation="../../mcs/schemas/Octopus.xsd"/>
    <!-- Elements -->
    <xs:element name="DeviceDescription"
    type="DeviceDescriptionType"/>
    <xs:element name="SpecVersion" type="SpecVersionType"/>
    <xs:element name="Personality" type="PersonalityType"/>
    <xs:element name="TransportBindings" type="BindingsType"/>
    <xs:element name="SecurityBindings" type="BindingsType"/>
    <xs:element name="Binding" type="BindingType"/>
    <xs:element name="Option" type="OptionType"/>
    <!-- Types -->
    <xs:complexType name="DeviceDescriptionType">
        <xs:sequence>
            <xs:element ref="SpecVersion"/>
            <xs:element ref="Personality"/> <!-- contains the device node and the signature -->
            <xs:element ref="TransportBindings"/>
            <xs:element ref="SecurityBindings"/>
        </xs:sequence>
    </xs:complexType>
    <xs:complexType name="SpecVersionType">
        <xs:attribute name="major" type="xs:nonNegativeInteger"
use="required"/>
        <xs:attribute name="minor" type="xs:nonNegativeInteger"
use="required"/>
    </xs:complexType>
    <xs:complexType name="PersonalityType">
        <xs:sequence>
            <xs:element ref="oct:Bundle"/>
        </xs:sequence>
    </xs:complexType>
    <xs:complexType name="BindingsType">
        <xs:sequence>
            <xs:element ref="Binding" maxOccurs="unbounded"/>
        </xs:sequence>
    </xs:complexType>
    <xs:complexType name="BindingType">
        <xs:sequence>
            <xs:element ref="Option" minOccurs="0"
            maxOccurs="unbounded"/>
```

-continued

```
        </xs:sequence>
        <xs:attribute name="type" type="xs:anyURI" use="required"/>
    </xs:complexType>
    <xs:complexType name="OptionType">
        <xs:simpleContent>
            <xs:extension base="xs:string">
                <xs:attribute name="name" type="xs:string" use="required"/>
            </xs:extension>
        </xs:simpleContent>
    </xs:complexType>
</xs:schema>
```

APPENDIX B

Figure 19:
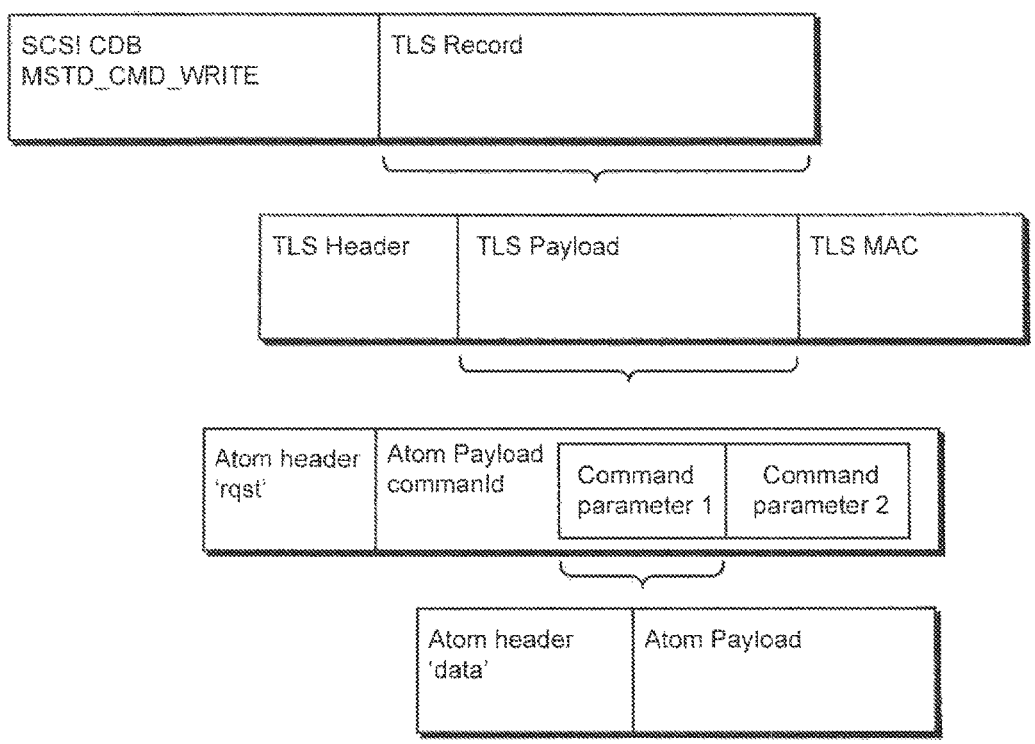
FIG. 19 shows an example message encapsulation.

FIG. 19 shows an example message encapsulation. In one embodiment, when using the TLS binding over USB, an example of a host request would be encapsulated as shown.

Although the foregoing has been described in some detail for purposes of clarity, it will be apparent that certain changes and modifications may be made within the scope of the appended claims. It should be noted that there are many alternative ways of implementing both the processes and apparatuses described herein. Accordingly, the present embodiments are to be considered as illustrative and not restrictive, and the inventive body of work is not to be limited to the details given herein, but may be modified within the scope and equivalents of the appended claims.

What is claimed is:

1. A method of exporting a license from a host device to a target device, the license for use in governing access to or other use of a piece of electronic content, the method comprising:
    accessing a license associated with a piece of electronic content;
    generating a simple validity statement data structure associated with the piece of electronic content based, at least in part, on the license, wherein generating the simple validity statement data structure comprises:
        encrypting a content key configured to decrypt the piece of electronic content using a first key;
        identifying, based on the license, one or more conditions relating to use of the piece of electronic content;
        determining that the identified one or more conditions make reference to at least one node;
        generating a simple validity statement record based on the identified one or more conditions;
        including the encrypted content key and the simple validity statement record in the simple validity statement data structure;
        generating one or more link validity statement records; and
        including the one or more link validity statement records in the simple validity statement data structure;
    digitally signing at least part of the simple validity statement data structure using a second key; and
    transmitting the simple validity statement data structure to the target device.

2. The method of claim 1, wherein the method further comprises determining that the license allows for the piece of electronic content to be transmitted to the target device.

3. The method of claim 1, wherein the first key and the second key comprise a same key.

4. The method of claim 1, wherein the first key and the second key comprise a pairing key.

5. The method of claim 4, wherein the method further comprises:
generating, as part of a pairing operation between the host device and the target device, the pairing key; and
transmitting the pairing key to the target device.

6. The method of claim 1, wherein the one or more link validity statement records further provide an indication of whether the at least one node is reachable from at least another node.

7. The method of claim 1, wherein the one or more link validity statement records further comprises an indication of a condition that must be satisfied in order for the one or more link validity statement records to be valid.

8. The method of claim 7, wherein the condition that must be satisfied in order for the one or more link validity statement records to be valid comprises a condition relating to the state of a domain membership of the target device.

9. The method of claim 1, wherein the simple validity statement records further comprise an indication of at least one condition that must be satisfied for the simple validity statement record to be valid.

10. The method of claim 9, wherein the at least one condition that must be satisfied for the simple validity statement record to be valid comprises a condition relating to a state variable.

11. The method of claim 10, wherein the condition relating to the state variable comprises a condition that the state variable is set to a predefined value before access to the piece of electronic content is granted.

12. The method of claim 9, wherein the at least one condition that must be satisfied for the simple validity statement record to be valid comprises a condition relating to an output of the target device.

13. The method of claim 9, wherein the at least one condition that must be satisfied for the simple validity statement record to be valid comprises a condition relating to a first predefined time value before which access to the piece of electronic content may be granted.

14. The method of claim 13, wherein the at least one condition that must be satisfied for the simple validity statement record to be valid further comprises a condition relating to a second predefined time value after which access to the piece of electronic content may be granted.

15. A non-transitory computer-readable storage medium storing instructions that, when executed by a processor of a trusted system, cause the processor to:
access a license associated with a piece of electronic content;
generate a simple validity statement data structure associated with the piece of electronic content based, at least in part, on the license, wherein generating the simple validity statement data structure comprises:
encrypting a content key configured to decrypt the piece of electronic content using a first key;
identifying, based on the license, one or more conditions relating to use of the piece of electronic content;
determining that the identified one or more conditions make reference to at least one node;
generating a simple validity statement record based on the identified one or more conditions;
including the encrypted content key and the simple validity statement record in the simple validity statement data structure;
generating one or more link validity statement records; and
including the one or more link validity statement records in the simple validity statement data structure;
digitally sign at least part of the simple validity statement data structure using a second key; and
transmit the simple validity statement data structure to the target device.

16. The non-transitory computer-readable storage medium of claim 15, wherein the one or more link validity statement records further provide an indication of whether the at least one node is reachable from at least another node.

17. The non-transitory computer-readable storage medium of claim 15, wherein the one or more link validity statement records further comprises an indication of a condition that must be satisfied in order for the one or more link validity statement records to be valid.

18. The non-transitory computer-readable storage medium of claim 17, wherein the condition that must be satisfied in order for the one or more link validity statement records to be valid comprises a condition relating to the state of a domain membership of the target device.

19. The non-transitory computer-readable storage medium of claim 15, wherein the first key and the second key comprise a pairing key.

20. The non-transitory computer-readable storage medium of claim 15, wherein the pairing key is generated as part of a pairing operation between the host device and the target device.

* * * * *